United States Patent [19]

Evers et al.

[11] Patent Number: 5,335,267

[45] Date of Patent: Aug. 2, 1994

[54] APPARATUS AND METHOD FOR TRANSMITTING TEXT DATA DIRECTLY TO A FACSIMILE MACHINE

[75] Inventors: John N. Evers, Fridley; Thomas N. Hilleary, Plymouth, both of Minn.

[73] Assignee: Autotrol Corporation, Milwaukee, Wis.

[21] Appl. No.: 936,332

[22] Filed: Aug. 28, 1992

Related U.S. Application Data

[63] Continuation of Ser. No. 593,993, Oct. 9, 1990, abandoned.

[51] Int. Cl.$^5$ .......................................... H04M 11/00
[52] U.S. Cl. ................................. 379/100; 379/106; 358/442; 340/531
[58] Field of Search ............... 379/107, 106, 100, 102, 379/103, 104, 105, 93, 96, 98; 358/400, 441, 442, 443; 340/531, 501, 506, 517, 521, 522, 533

[56] References Cited

U.S. PATENT DOCUMENTS

| | | | |
|---|---|---|---|
| 3,358,811 | 1/1971 | Montevecchio et al. | 198/831 |
| 3,842,208 | 10/1974 | Paraskevakos | 379/47 |
| 4,504,831 | 3/1985 | Jahr et al. | 340/870.03 |
| 4,549,044 | 10/1985 | Durham | 379/106 |
| 4,652,933 | 3/1987 | Koshiishi | 358/426 |
| 4,654,147 | 3/1987 | Bagley | 210/744 |
| 4,746,986 | 5/1988 | Tanigawa | 358/442 |
| 4,773,080 | 9/1988 | Nakajima et al. | 375/5 |
| 4,816,911 | 3/1989 | Kirsch et al. | 379/100 |
| 4,817,131 | 3/1989 | Thornborough et al. | 379/107 |
| 4,850,008 | 7/1989 | Berg et al. | 379/93 |
| 4,864,602 | 9/1989 | Yamamoto et al. | 379/100 |
| 4,881,129 | 11/1989 | Mitsuhashi | 358/434 |
| 4,897,799 | 1/1990 | LeGall et al. | 364/514 |
| 4,975,841 | 12/1990 | Kehnemuyi et al. | 379/100 |
| 5,041,918 | 8/1991 | Ishida et al. | 379/100 |
| 5,046,084 | 9/1991 | Barrett et al. | 379/103 |
| 5,061,916 | 10/1991 | French et al. | 379/106 |
| 5,168,548 | 12/1992 | Kaufman et al. | 379/100 |

OTHER PUBLICATIONS

"Damar Product Brochure", Sygnus Controls, Inc. Jan. 26, 1990.

*Primary Examiner*—Curtis Kuntz
*Assistant Examiner*—Stella C. Woo
*Attorney, Agent, or Firm*—Jansson & Shupte, Ltd.

[57] ABSTRACT

A monitoring apparatus includes a conversion module having firmware embedded therein for converting text data in a first code such as ASCII to binary text data in a second code such as facsimile scan line code. A memory module is connected to the conversion module for facilitating communication of text data in a first code between the conversion module and such memory module. An analog module is connected to the conversion module for interfacing the modem with the telephone line. The apparatus is arranged to monitor a parameter of a controlled process variable, e.g., temperature, signal strength, humidity or the like and responsively generate text data in a first code. The apparatus converts such text data in first code to binary text data in a second code and transmits such converted text data directly to a facsimile machine. Such operation is accomplished without the use of a PC or floppy or hard discs, program cards or other PC-like devices. A method for transmitting text data directly to a facsimile machine is also disclosed.

17 Claims, 8 Drawing Sheets

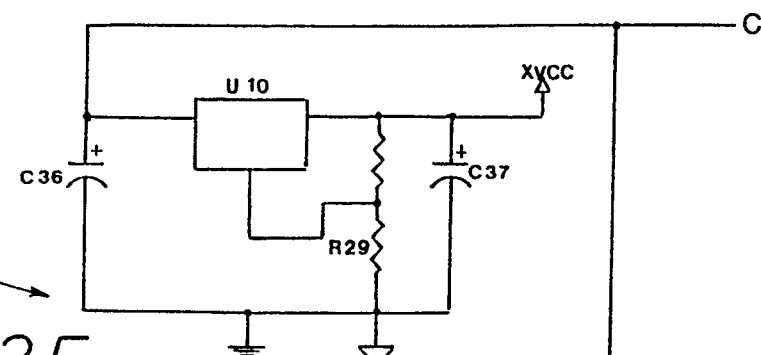
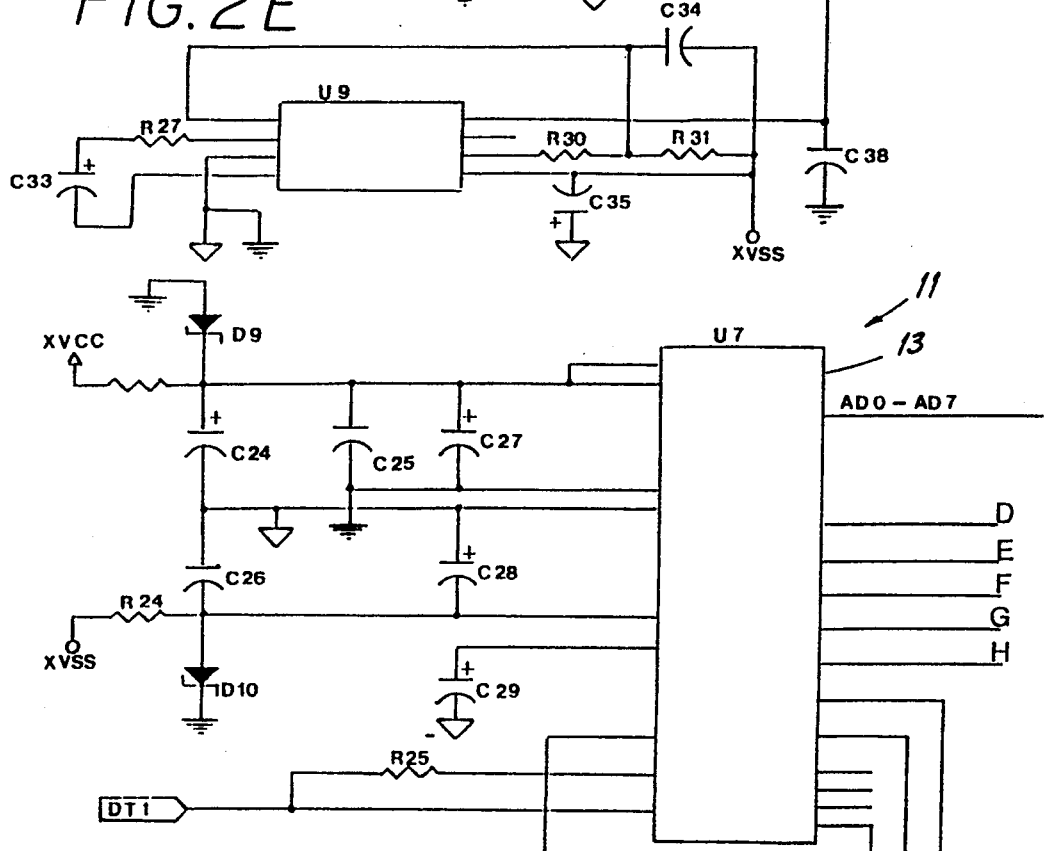
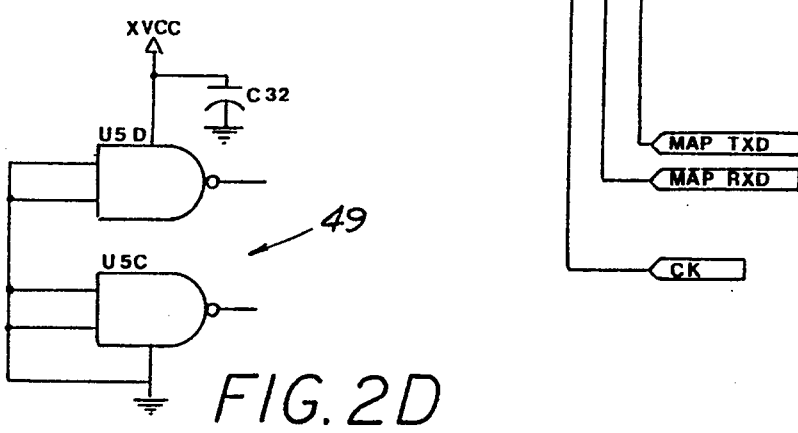

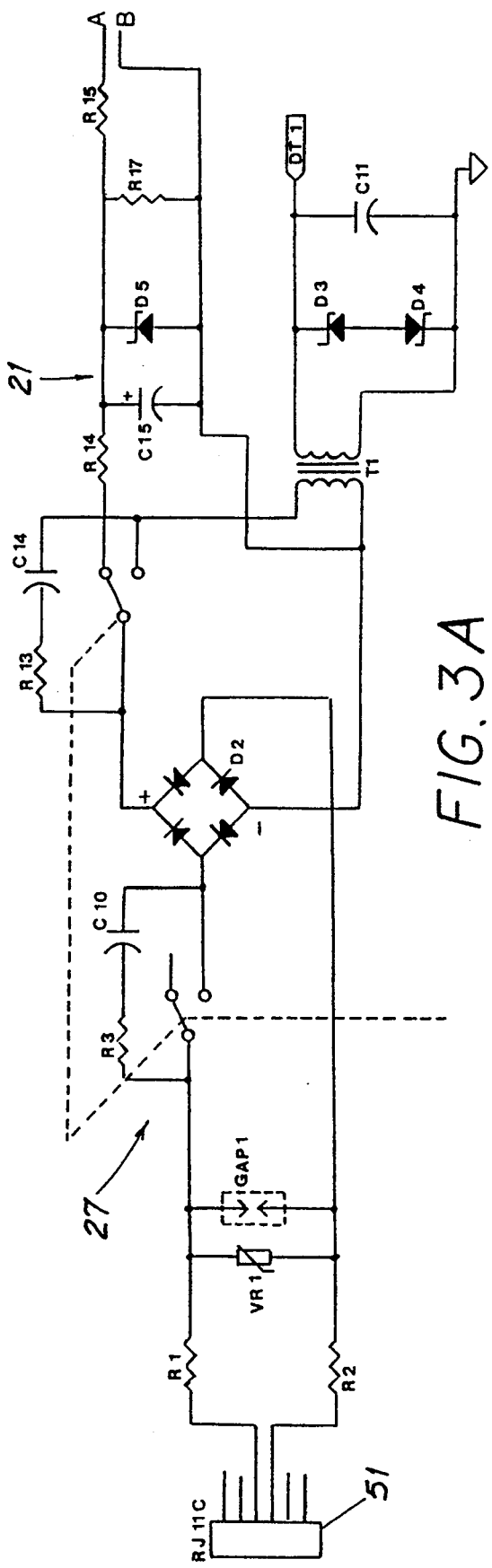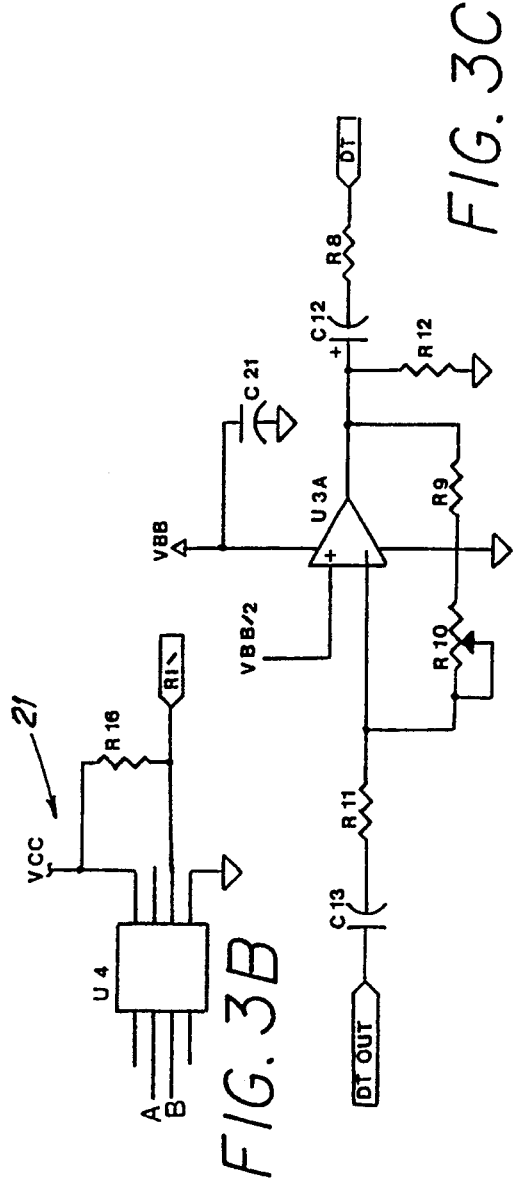

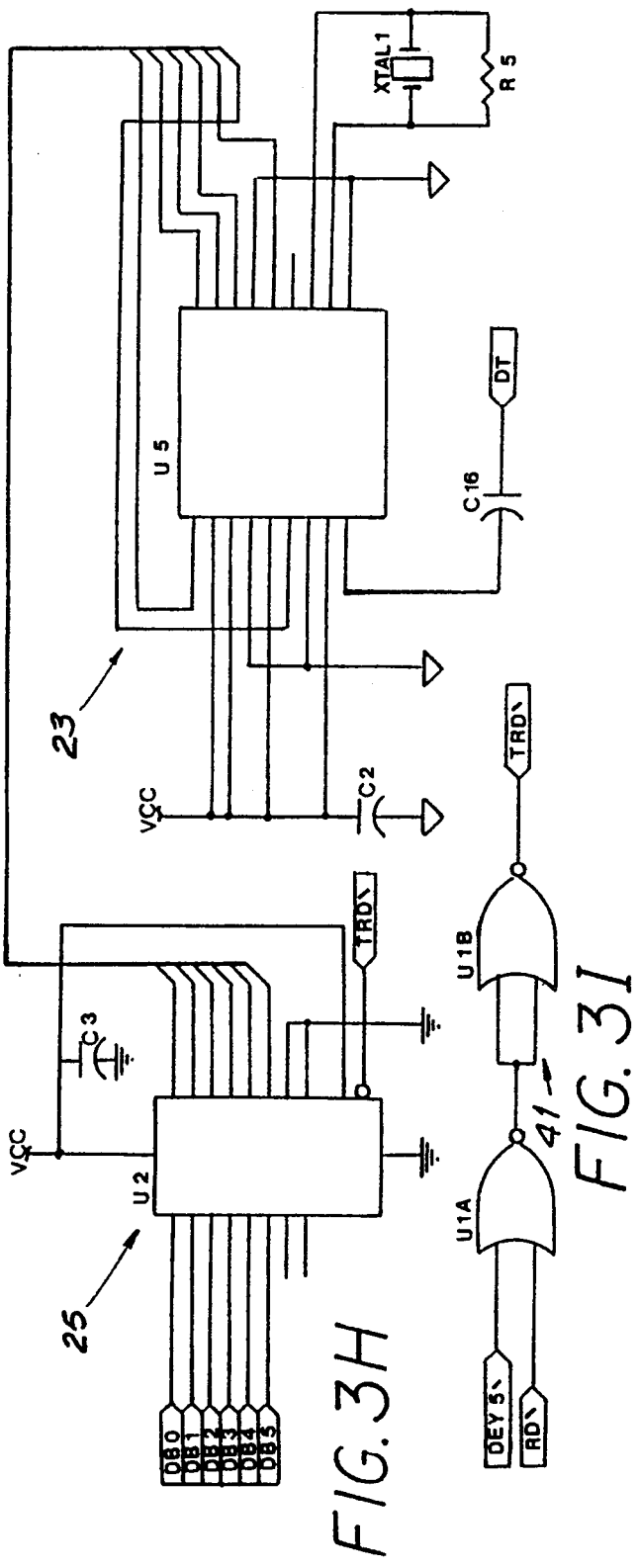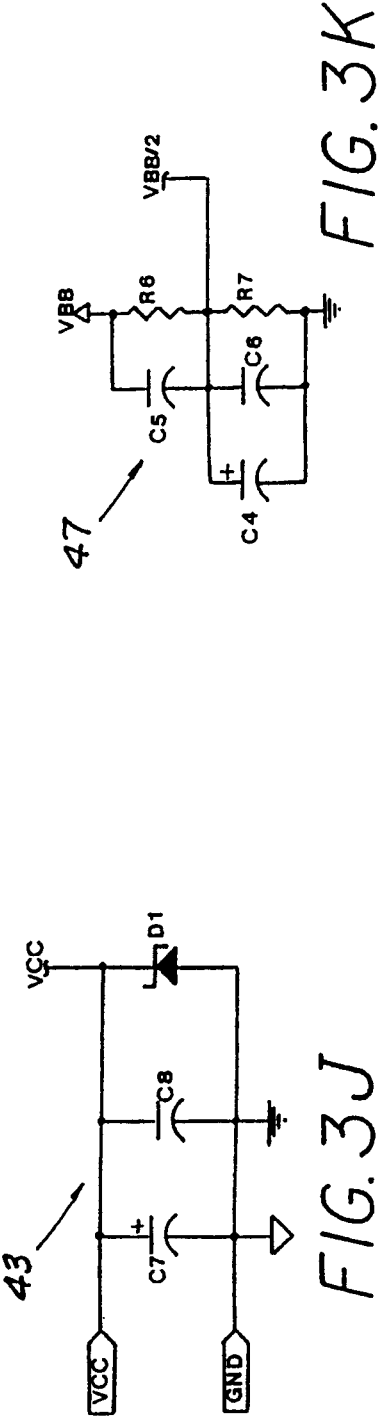

APPARATUS AND METHOD FOR TRANSMITTING TEXT DATA DIRECTLY TO A FACSIMILE MACHINE

RELATED APPLICATION

This application is a continuation of application Ser. No. 07/593,993 filed on Oct. 9, 1990, and now abandoned.

FIELD OF THE INVENTION

This invention is related generally to a monitoring apparatus and, more particularly, to such apparatus having firmware embedded therein for converting text data in a first code to binary text data in a second code and transmitting such converted binary data directly to a facsimile machine. The apparatus is particularly useful for monitoring and reporting on controlled process variables and for meter reading.

BACKGROUND OF THE INVENTION

Monitoring apparatus and devices are widely used for remotely monitoring a particular parameter or group of parameters. Such apparatus and devices provide reports on such parameters to a central computer system (CCS) equipped with what has come to be known as a personal computer (PC). The apparatus may be configured to provide such reports on a time basis, e.g., and/or upon the occurrence of a predetermined parameter value. Examples of such parameters include liquid flow rate, the signal strength of a transmitted radio-frequency signal, temperature, pressure and a host of other parameters relating to process control.

Certain known types of monitoring systems are embodied as a group of automatic dialers with synthesized voice or data telemetry dialers. Such systems "talk to" responding humans or a CCS using the several individual monitoring apparatus or "out stations" or remote terminal units (RTU) as they are sometimes called. Each of such apparatus is coupled to the conventional telephones or CCS by a dedicated conductor or, more typically, by a dial-up telephone line using a standard modem.

Typical monitoring apparatus provide such reports in a digital code which is compatible with the CCS but not with a facsimile machine to which it may transmit data. Therefore, a code conversion is required to be made in the latter instance in order to complete the communication "link" between the apparatus and the facsimile machine. Heretofore, such code conversions have been made using "PC-like" conversion techniques and devices such as floppy discs (with accompanying disc readers). Conversions are also made using specially constructed "program cards," i.e., printed circuit boards insertable into a PC, either arrangement being for the purpose of "loading" conversion programs into and out of memory.

The arrangement shown in U.S. Pat. No. 3,558,811 (Montevecchio et al.) involves an interface adapter unit for converting facsimile signals to computer signals and vice versa. The resulting "hard" or paper copy is under the control of the computer. The Montevecchio et al. arrangement uses selected programs "loaded" to a memory unit and video or video-like signals during the conversion process.

Another, similar system is shown and described in U.S. Pat. No. 4,816,911 (Kirsch et al.). The system shown therein permits communication between a PC and a facsimile machine. The PC is equipped with a communication card and its hard-disc memory may be supplemented by a video card.

Yet another type of monitoring apparatus is described in a brochure relating to what is called the DAMAR ® ("Data Acquisition Monitoring and Reporting System") system, such brochure being published by Sygnus Controls, Inc. The Sygnus system accepts analog process input signals in the 4–20 ma. range, each such signal being directed to a separate plug-in input card which are understood to use PC-like code conversion techniques as aforementioned. There is no apparent provision for accepting digital input signals. Both time-based and event-based reports are generated and sent to a facsimile machine and archival data storage can be accomplished with an optional floppy disc drive.

The apparatus and systems described in the foregoing patents and Sygnus brochure tend to share certain disadvantages. A major disadvantage is that such systems use a PC or PC-like techniques and hardware to convert code from the monitoring apparatus into a code compatible with a facsimile machine. The Sygnus apparatus additionally requires conversion of analog signals into digital code before any digital code conversion can occur. Another disadvantage of the Sygnus apparatus is that it is apparently unable to communicate with a CCS. Irrespective of the particular type of system, code conversion using PC-like techniques adds materially to its cost and complexity.

A monitoring apparatus which has a conversion code embedded in firmware to convert text data in a first code (such as ASCII) into a second code (such as scan line code used by facsimile machine) would be an important advance in the art. Such an apparatus could be directly interposed between a measuring device such as a pressure gauge and a facsimile machine (and, optionally, a PC), thereby negating any need for the aforementioned PC or PC-like conversion techniques with their attendant cost. A related method for transmitting a report in binary text data from a monitoring apparatus directly to a facsimile machine would likewise be an important advance in the art.

OBJECTS OF THE INVENTION

It is an object of this invention to overcome some of the problems and shortcomings of the prior art.

Another object of this invention is to provide an improved apparatus and method for transmitting a report directly to a facsimile machine while yet avoiding PC or PC-like code conversion techniques and devices.

Still another object of this invention is to provide an improved apparatus having a conversion code embedded in u firmware.

Another object of this invention is to provide an improved apparatus and method for transmitting text data wherein such data in a first code is converted by the conversion code to binary text data in a second code.

Yet another object of this invention is to provide such an improved apparatus and method wherein the first code is ASCII code.

Another object of this invention is to provide such an improved apparatus and method wherein the second code is scan line code coincident with that used by the facsimile machine.

Another object of this invention is to provide an improved apparatus and method useful for monitoring and reporting on one or more controlled process variables such as signal strength, flow rate, temperature, pressure and the like.

These and other important objects will be apparent from the descriptions of this invention which follow.

SUMMARY OF THE INVENTION

The improved apparatus and method permits transmission of a report in text data from the apparatus directly to a facsimile machine and, optionally, to a CCS. Such reports relate to the status of a monitored parameter such as temperature, pressure, flow rate and/or other controlled process variables.

Text data from the monitoring apparatus is in a first code and a conversion module is provided therein, such module having embedded firmware for converting the first code to a second code. A command set is transmitted to the conversion module for selecting the facsimile mode of operation. Transmission of text data to the conversion module is then implemented, such text data being in the first code. Using the embedded firmware, such text data is converted to a second code, thereby providing converted binary text data. Preferably, the second code is coincident with that used by the facsimile machine and such converted text data is sent directly to the facsimile machine.

In one highly preferred embodiment, the monitoring apparatus includes a host processor, the command set is transmitted from the monitoring apparatus and includes a special character for selecting the facsimile mode of operation. Such command set further includes the encoded dial number of the facsimile machine, a command for specifying a page text header, a command for initiating a page break and a command for establishing the baud rate of communication between the host processor and the conversion module. The command set may also include a command to print the report on the facsimile machine in characters which are enlarged as to height, width or both.

Since the preferred apparatus and method may additionally be used to communicate with a CCS and since the text editor function of many PC's is in a code known as the American National Standard Code for Information Interchange (ASCII), the first code is preferably ASCII code. Such code is converted by the embedded firmware using coding rules in accordance with a predetermined specification such as one-dimensional coding rules developed by an international telecommunications standards committee. Such rules are embodied in what is known as CCITT specification T4.

In the method, the implementing step includes the steps of (a) transmitting a prompting signal from the conversion module to initiate transmission of text data in a first code to the conversion module and (b) initiating the converting step. Such converting step is initiated upon the occurrence of one of a predetermined plurality of events including receipt at the conversion module of a signal indicating the end of the text data or the absence of text data transmission over a time in excess of a predetermined time such as 3 seconds.

The preferred apparatus includes a conversion module having firmware embedded therein for converting text data in a first code to binary text data in a second code. A memory module is connected to the conversion module for facilitating communication of text data in a first code between the conversion module and such memory module. An analog module is connected to the conversion module for interfacing the apparatus with the telephone line, the apparatus thereby being arranged to receive text data in a first code, convert such text data to binary text data in a second code and transmit such converted text data directly to the facsimile machine.

The improved apparatus and method are useful in a wide variety of controlled process applications. Such applications involve the execution of steps to achieve a particular result and the accuracy with which such steps are carried out is important, sometimes critical, to the success of the final result. Merely by way of example, the apparatus may be connected to a water treatment system for monitoring and reporting a parameter indicating water quality or to a gas pipeline for monitoring a parameter of gas quality measurement. The improved apparatus and method may also be used to monitor and report on avionics equipment, power generating stations, livestock and horticultural husbandry facilities and telephone substations, to name but a few additional applications.

BRIEF DESCRIPTION OF THE DRAWINGS

FIGS. 2A through 2E, inclusive, comprise the electrical schematic diagrams for portions of the circuit diagram of FIG. 1.

FIGS. 3A through 3K inclusive comprise the electrical schematic diagrams for other portions of the circuit diagram of FIG. 1.

FIGS. 2A through 2C represent the primary circuit components of the diagram of FIG. 1, e.g., the processors and memory circuits. FIGS. 2D, 2E and 3A through 3K represent other "support" circuits which aid in adapting the apparatus for connection to a telephone line. FIGS. 1 through 3K use conventional terminal and connection identifiers to denote interconnections.

DETAILED DESCRIPTIONS OF PREFERRED EMBODIMENTS

Figure 1:
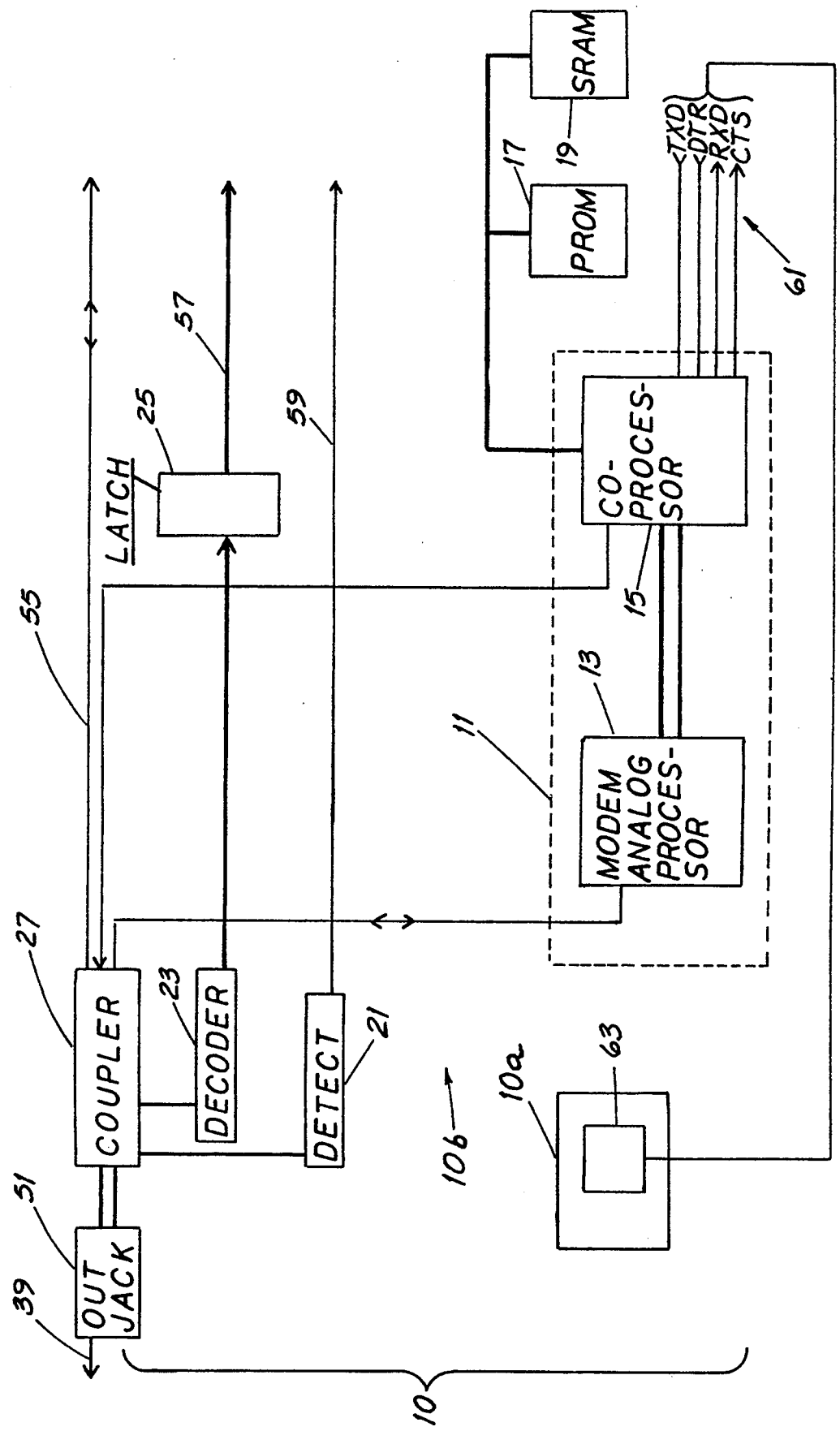
FIG. 1 is a block circuit diagram of the improved monitoring apparatus.
Figure 2B:
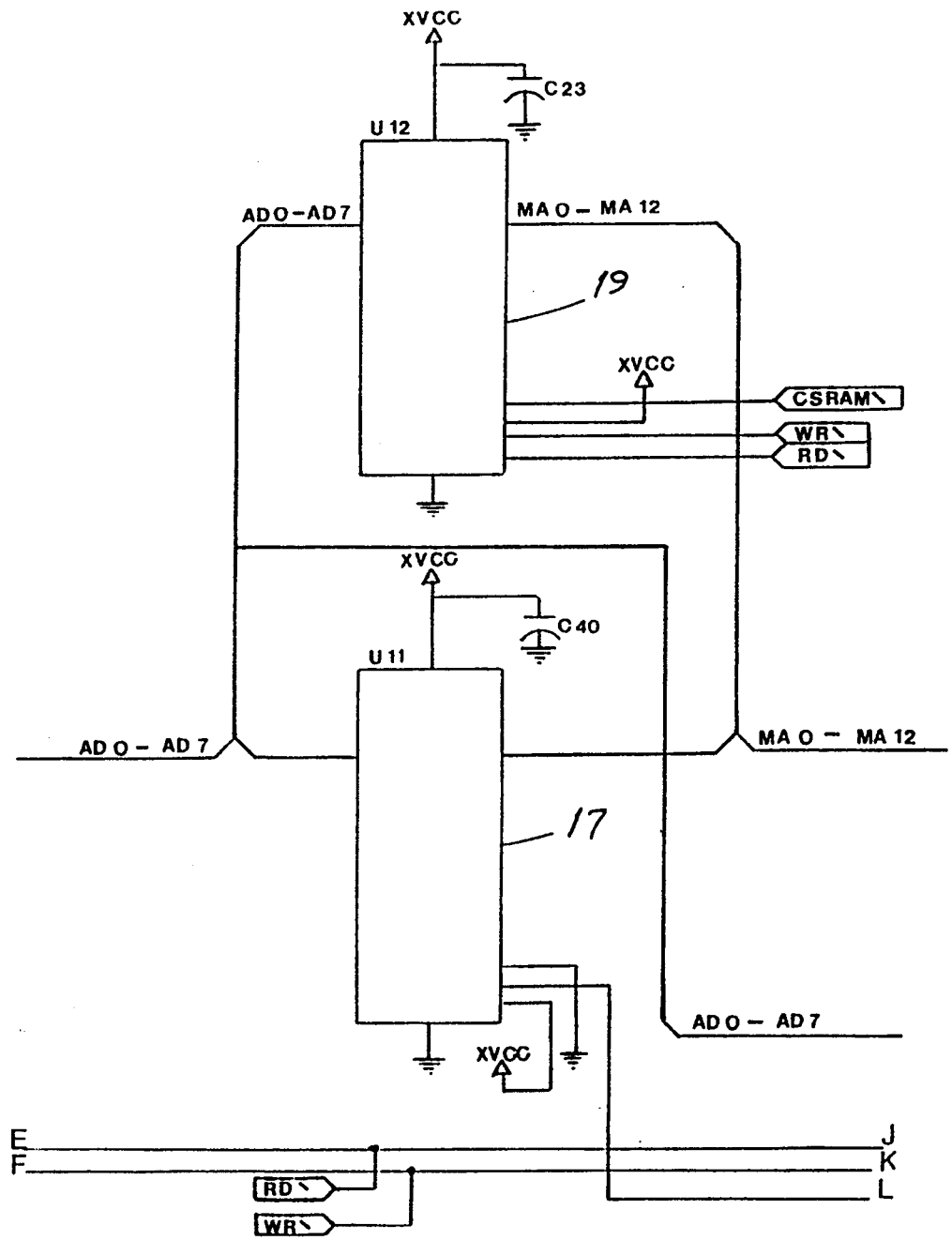
Figure 2C:
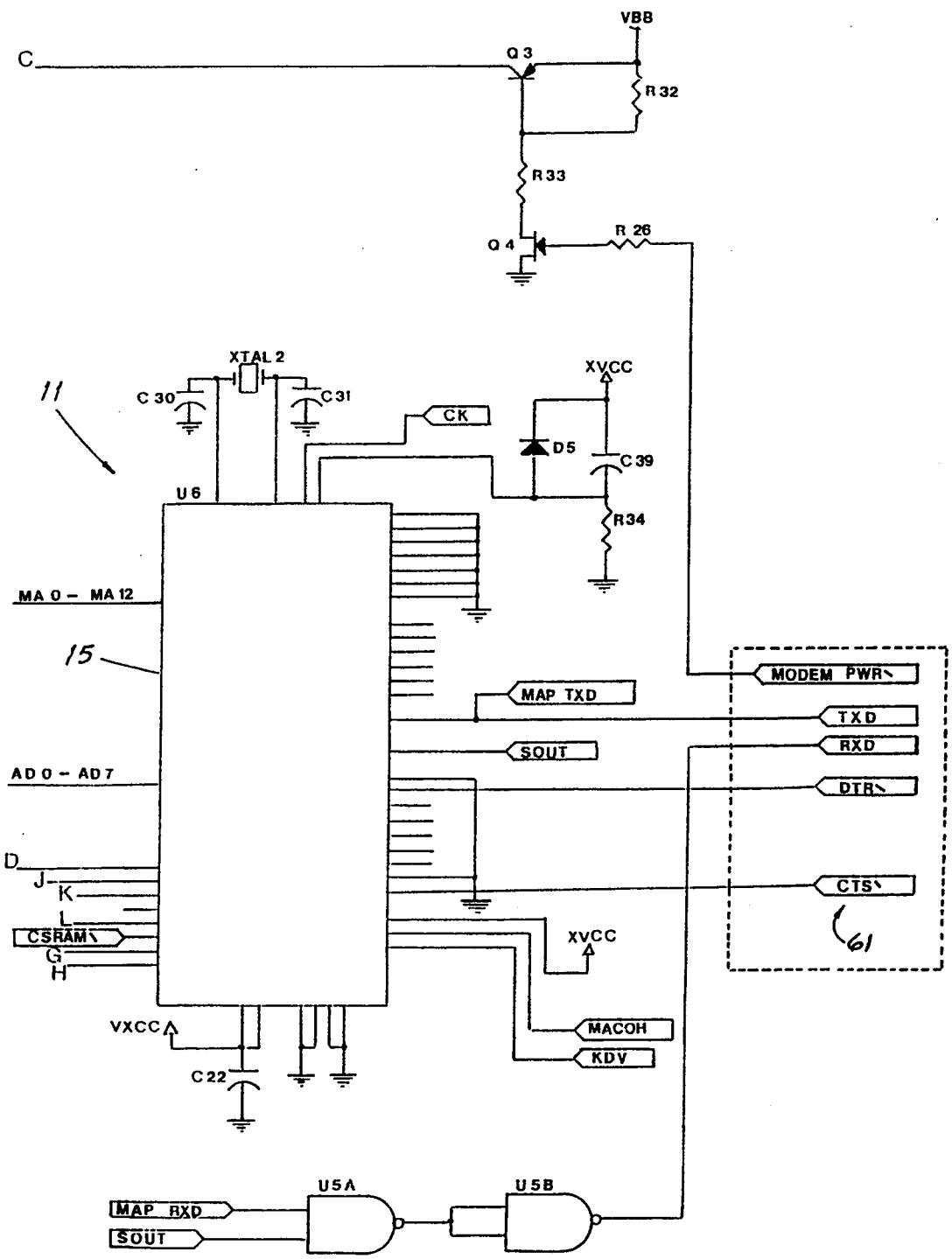

The FIGURES show the improved monitoring apparatus 10 in accordance with the invention.

Before describing the preferred embodiments, it will be helpful to appreciate certain terminology used in connection with such description. As used herein, "firmware" means computer programming embedded in the structure of a semiconductor chip and excludes computer programming embedded in such PC-like devices as floppy discs, hard discs and program input cards.

The term "controlled process variable" means a parameter (e.g., temperature, signal strength, humidity or the like) of a process which varies due to the influence of external factors, which is important in achieving the anticipated result of the process and which is subject to monitoring and to controlled modification. The term "monitored parameter" means a controlled process variable, a representative signal of which is detected by the apparatus 10. The term "text data" means digitally-encoded data arranged in a format such that when properly decoded and printed or plotted, the data appears in visual and human-readable textual form. In the specification, the monitoring apparatus 10 is described as having two primary components, namely, a monitoring portion 10a and a modem portion 10b. The former detects a signal which represents a monitored parameter while the latter interfaces the apparatus 10 to a telephone line. In the first embodiment, the portions 10a, 10b are separate components while in the second embodiment, they are integrated to form a "stand alone" device.

Referring first to FIG. 1 and FIGS. 2A–2C, the improved apparatus 10 is shown to include a conversion module 11 having a modem analog processor 13 and a digital co-processor 15. A highly preferred processor 13 is the SC11046 and a highly preferred co-processor 15 is the SC11011, both by Sierra Semiconductor Co. The latter co-processor 15 is preferred because of its memory capacity which permits the conversion code to be embedded therein in firmware rather than having to resort to a separate floppy disc, hard disc, program input card or other PC-like device. A program memory chip 17 (of the PROM type) and a data memory chip 19 (of the SRAM type) are connected to the co-processor 15 and provide supplementary memory capacity for program and text data, respectively.

Figure 3E:
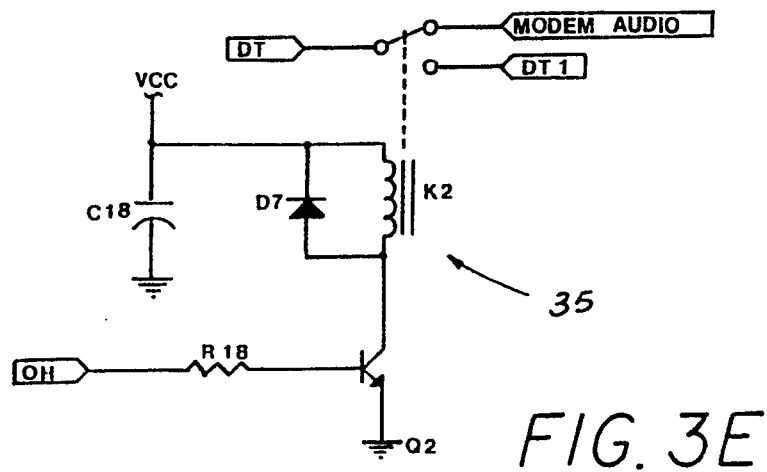
Figure 3F:
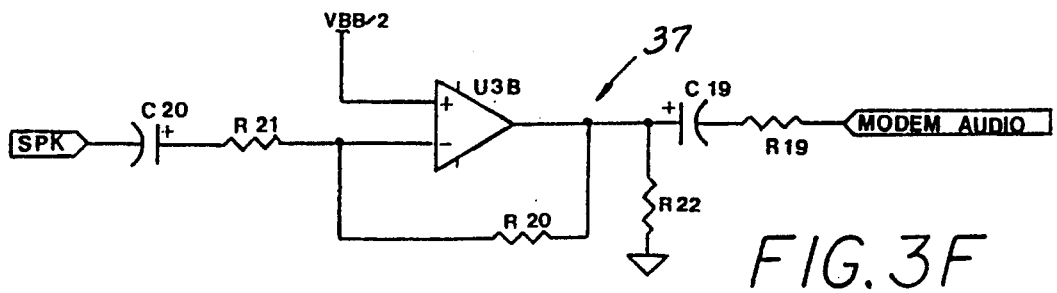
Figure 3D:
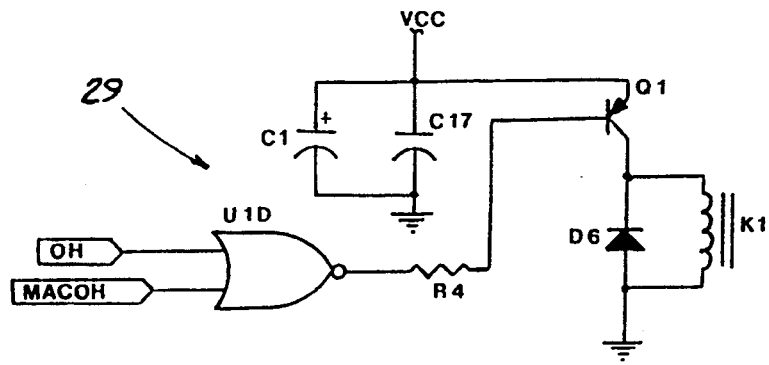
Figure 3G:
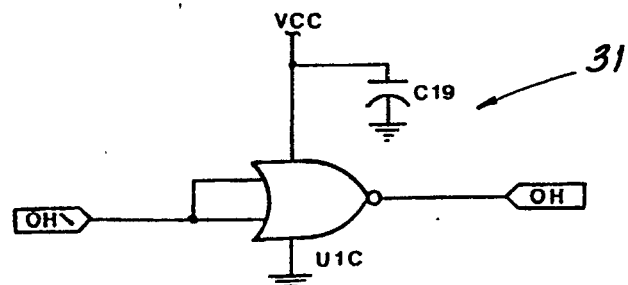

Referring additionally to FIGS. 3A–3K and FIGS. 4–6, the apparatus 10 also includes a ring detection circuit 21 (FIGS. 3A, 3B), a dual tone multi-frequency (DTMF) decoder circuit 23, a latch circuit 25 (FIG. 3H) and a protective coupler 27 (FIG. 3A). An off-hook control circuit 29 (FIG. 3D) is included and a dual control circuit 31 (FIG. 3G) permits the state of the off-hook relay to be controlled by the monitoring portion 10a or by the modem portion 10b.

Other supplemental circuits include a switching circuit 35 (FIG. 3E) for switching an auxiliary audio line in and out, an operational amplifier circuit 37 (FIG. 3F) for amplifying signals from a telephone line 39 to the apparatus 10 and a tone detect circuit 41 (FIG. 3I) for detecting "touch-tone" tones on the DTMF decoder circuit 23. Still other supplemental circuits include a voltage filtering and clamping circuit 43 (FIG. 3J) for filtering power supply voltage and preventing it from exceeding a predetermined value, a source circuit 45 (FIG. 2E) for providing various voltages used in the apparatus 10 and a voltage divider circuit 47 (FIG. 3K) for providing the voltage VBB/2. A spare gate circuit 49 is shown in FIG. 2D.

The coupler 27 is connected to an output jack 51 used to connect the apparatus 10 to one or more facsimile machines 53 via a telephone line 39. An auxiliary audio line 55, a host dialer bus interface line 57 and a ring detect line 59 are provided for external connection to the indicated functions. The serially-connected apparatus 10 also includes four standard serial control lines 61 including a transmit-data line TXD, a receive-data line RXD, a request-to-send line DTR and a clear-to-send line TCS.

Since the co-processor 15 is an important part of the apparatus 10, its features will now be described. The standard Sierra co-processor includes firmware which permits the apparatus 10 to function conventionally at 2400 baud using the well-known Hayes AT instruction set. The apparatus 10 is thereby useful for transmitting data to and from distant computer modems using a communication standard compatible with such modems and with the text editors of the computers connected to them.

In the inventive apparatus 10, the conversion module 11 and more specifically, the co-processor 15 within such module 11 has firmware embodying a unique conversion code. The object code version of which is set forth at the end of the specification. This code converts text data transmitted from the monitoring apparatus 33 in a first code to binary text data in a second code. The first code and the second code may be any two different codes as now known or later developed.

However, in a highly preferred embodiment, the conversion code is configured for use with a first code which is ASCII and a second code which is coincident with that used by the facsimile machine 53. Preferably, conversion of the first code into the second code is performed using coding rules in accordance with a predetermined specification, namely, CCITT specification T.4 and the one-dimensional coding rules embodied therein. The co-processor 15 also includes a character "look up" table, the characters of which are identical to the known IBM 256 character set.

As shown generally in FIG. 1 and in a first highly preferred embodiment, the apparatus 10 includes a separate monitoring portion 10a having a host microprocessor 63. Examples of such a portion 10a are the TDS 3500 telemetry device and the MCS 500 automatic dialer, both from Autotrol Corporation of Milwaukee, Wisc. or divisions thereof. It is to be appreciated that the monitoring portion 10a and the modem portion 10a may also be combined as a single integrated apparatus 10. The host microprocessor 63 controls the input-output (I/O) function of the lines TXD, DTR, RXD and CTS. Such control is generic for all applications.

In addition, the host microprocessor 63 is embedded with application-specific software configured in recognition of the way in which the monitoring portion 10a is used. For example, the portion 10a may be required to recognize a binary signal in the form of a change-of-state of an electrical contact (from closed to open, for example) or to recognize an analog signal representing changes in liquid level. Such portion 10a may also recognize signals representing temperature, humidity and any one or some of several other parameters which are well known in the instrumentation and process control field.

When configured for use with the apparatus 10, the host microprocessor 63 also has embedded therein what may be termed a "superset" of the Hayes AT modem commands. These superset commands differ from the standard Hayes AT commands only in that they are preceded by a signal which represents the "+" symbol. Such symbol is selected arbitrarily as a matter of convenience and another identifying symbol could be used.

Specific superset commands and the way in which they cause text data to ultimately be transmitted directly to a facsimile machine 53 are best explained by use of an example. It is first assumed that the monitoring portion 10a needs to send text data to a facsimile machine 53. Such need may arise because of the lapse of time, as where the monitoring portion 10a is required to "report" data each hour, or by the occurrence of an event such as the closure of an electrical contact or the presence of a humidity value which has strayed outside a specified range of values.

Irrespective of whether such reporting function is initiated by the passage of time or by the occurrence of an event, the host microprocessor 63 transmits a command to the co-processor 15 in the format "+Dn." A command in this format is a command to dial a specified number in facsimile transmission mode. An example of a specific command (based on the Hayes AT command set) may be "AT + DT 2288729." When this command (which includes the telephone number of the receiving facsimile machine 53) is received in the co-processor 15, the co-processor 15 acknowledges with a prompting signal to the host microprocessor 63 to initiate transmission of text data in a first code which in the example is ASCII code.

If the co-processor 15 fails to receive such data from the host microprocessor 63 within a predetermined time, ten seconds for example, the co-processor 15 will revert to an idle mode. However, if data is received before the end of such predetermined time, the co-processor receives and stores such data, in first code form, in the SRAM memory.

The co-processor 15 initiates a converting step upon the occurrence of any one of a plurality of events. Such events include (a) receipt at the conversion module 11 of a signal indicating the end of the text data, (b) the absence of text data transmission over a time in excess of a predetermined time (3 seconds, for example) or (c) reaching the memory capacity of the SRAM memory chip 19.

Following any one of the foregoing events, the co-processor 15 dials the telephone number of the designated facsimile machine 53. When the transmission capability is established, the co-processor 15 retrieves text data from the SRAM memory chip 19 and in the first code, converts such data on a character-by-character basis to a binary second code and transmits such text data in second code to the facsimile machine 53. When transmission is complete, the co-processor 15 signals the host microprocessor 63 that additional data can be accepted. The foregoing continues until all text data then available from the host microprocessor 63 has been sent to the facsimile machine 53.

As described above, the command from the host microprocessor 63 will include a first command in the format of "+Dn." However, in a highly preferred embodiment, such command set may include other commands such as a command in the format "+Xn" and/or "+Yn". The former constitutes a command for printing the report in characters enlarged in the "X" direction while the latter is a command for printing in characters enlarged in the "Y" direction and either or both may be used.

In a highly preferred embodiment, the command set also includes a command in the format "+Fn" which selects the baud rate at which the host microprocessor 63 will issue commands and data to the co-processor 15. Available rates are n=1 (19,200 bps); n=2 (9,600 bps) and n=3 (4,800 bps). At rates equal to or less than 2400 bps, the co-processor 15 detects the baud rate by autobaud.

Still another command which may occur in the command set is in the form "+Hi" which permits the host microprocessor 63 to specify a text header to appear at the top of each page as reproduced by the receiving facsimile machine 53. Still another command which may be in the command set is in the form "+Ln" which allows the host microprocessor 63 to select the number of lines per page printed by the facsimile machine 53, such selection ranging from 1 to 255. In the absence of a different page length command, a default value of 60 lines per page is selected.

Communication between the host microprocessor 63 and the co-processor 15 is facilitated by certain result codes which may be sent from the co-processor 15 to the microprocessor 63. Like those result codes used with the standard Hayes AT protocol, such result codes may be received in "verbose" or "non-verbose" modes. The following table sets forth examples of result codes used in the apparatus 10.

| Non-Verbose | Verbose | Usage |
| --- | --- | --- |
| a | CED | Answertone detected |
| g | CFR | Remote confirmation to receive |
| w | CONNECT 2400/FAN | Connection 2400 bps |
| x | CONNECT 4800/FAN | Connection 4800 bps |
| e | CRC Error | Error in received frame |
| c | CRP | Repeat request |
| — | CSI | Remote machine ID |
| d | DCN | Disconnect |
| b | DIS | Remote machine capabilities |
| f | FTT | Failure to train |
| i | INVALID FRAME | Received frame is invalid |
| m | MCF | Message received correctly |
| h | RTN | Message received incorrectly |
| j | RTP | Retrain positive |
| l | LOAD TEXT FILE | Response to the +Dn command |
| n | PAGE # | Current page number indication |
| o | DIALING . . . | Message when dialing commences |
| p | ENTER HEADER | Response to the +H1 command |
| r | NO RESPONSE | No remote fan connection |
| u | DATA TIMEOUT | 10 second data timeout |

Figure 4:
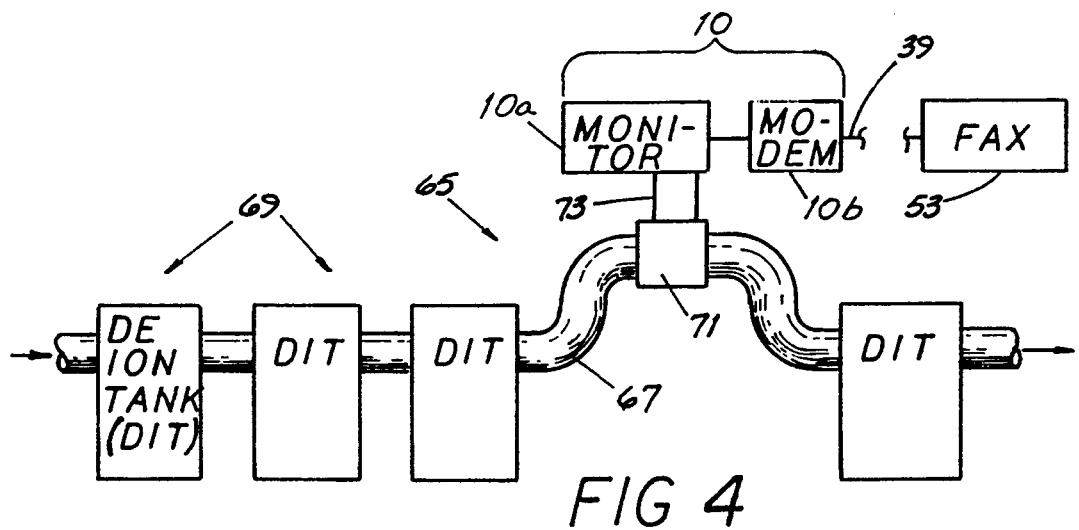
FIG. 4 is a block diagram showing how the improved apparatus and method are used in a water treatment application.
Figure 5:
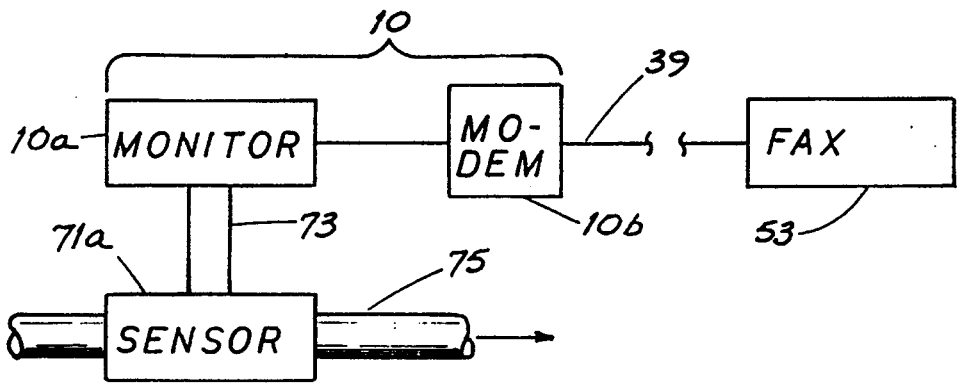
FIG. 5 is a block diagram showing how the improved apparatus and method are used in a gas transmission pipeline application.
Figure 6:
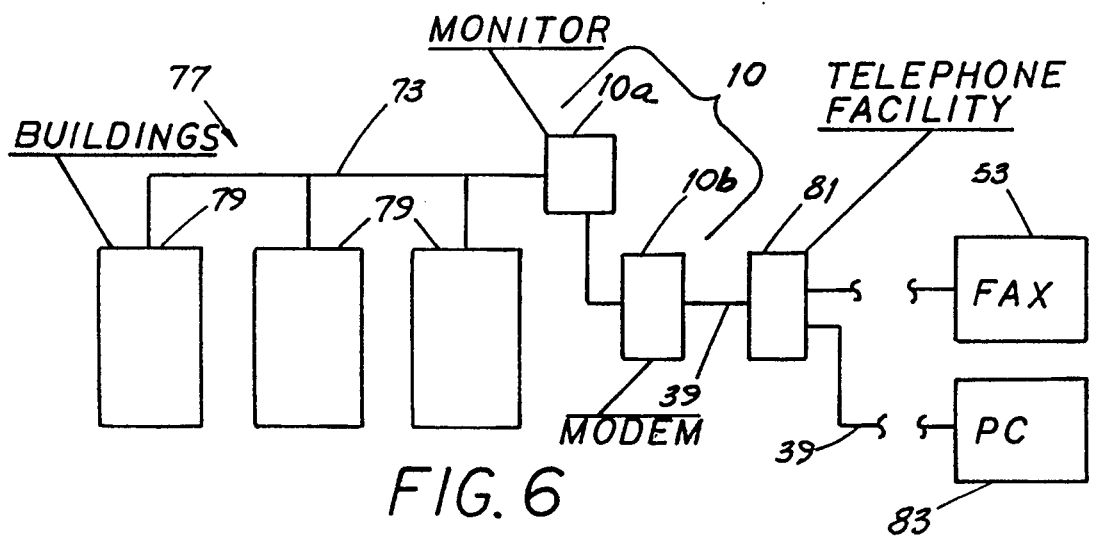
FIG. 6 is a block diagram showing how the improved apparatus and method are used in a horticultural husbandry application.

Referring particularly to FIGS. 4, 5 and 6, a few of the many uses of the improved apparatus 10 and method will now be explained. FIG. 4 shows an ion-exchange system 65 used for treating water involved in healthcare or industrial processes. The system 65 includes a pipe 67 for conducting water and several de-ioning tanks 69 in series along the pipe 67. One or more sensors 71 are connected to detect such controlled process variables as flow rate and water conductivity. A monitoring portion 10a is connected by electrical leads 73 to such sensors 71 to detect changes in such process variables and report them on a time and/or event-driven basis. Reporting is by transmitting text data in a first code from the portion 10a to the portion 10b and thence to the facsimile machine 53 in a second code.

FIG. 5 shows a natural gas pipeline 75 having a sensor 71a in series therewith for detecting a parameter relating to the quality of the gas, e.g., BTU's per unit volume. The monitoring portion 10a is connected to the sensor 71a and text data is transmitted to a facsimile machine 53 as described above.

FIG. 6 shows a horticultural husbandry operation 77 having several greenhouse-like buildings 79 in which plants are grown under controlled conditions. The controlled process variables relating to such operation 77 will include at least temperature and humidity, both of which are measured by sensors (not shown). The monitoring portion 10a detects the output signals from such sensors and text data is transmitted through a telephone facility 81 and thence to a facsimile machine 53 as described above and, optionally, also to a PC 83. Telephone lines 39 are used for such transmission.

It is to be appreciated that in highly preferred arrangements, the systems shown in FIGS. 4 and 5 will also include a telephone facility 81 and a PC 83, both of which are omitted from FIGS. 4 and 5, for ease of initial understanding.

Further examples of industrial processes and the controlled process variables which are a part thereof are well known and a recitation of them will only result in prolixity.

A second highly preferred embodiment of the apparatus 10 differs only slightly from the first embodiment in that the apparatus 10 integrates a monitoring portion 10a and a modem portion 10b to form a "stand alone" apparatus 10. After appreciating the foregoing and the following brief explanation, one of ordinary skill will readily understand how to make and use such a combined apparatus 10 without further drawings or detailed explanation.

To provide such a standalone combination, the microprocessor 63 is eliminated and the co-processor 15 absorbs its functions. That is, co-processor 15 preferably is similar to the INTEL 8096 device and has application-specific firmware therein including latching and conditioning functions. The superset of Hayes AT modem commands may be eliminated since such commands are already embedded in co-processor 15 is replaced by an application-specific integrated circuit (ASIC) microprocessor which emulates the Intel 8096 device. Such microprocessor interfaces with the processor 13 and uses conventional support components such as an 8K × 8 SRAM, EEPROM and a 256K program ROM containing the operating software. Such program ROM also has embedded therein the serial interface routines, the standard Hayes AT command set, the command "superset" and other firmware including the conversion code. In particular, the program ROM also includes firmware providing the capability for monitoring and appropriately responding to signals representing controlled process variables. Computer program listings relating to the invention are attached as an appendix.

While the principles of this invention have been described in connection with specific embodiments, it should be understood clearly that these descriptions are made only by way of example and are not intended to limit the scope of the invention.

What is claimed is:

```
:020000020000FC
:10000000E7090300F23E1409B2C0C4711FC490C4D2
:100010014E01779B106179900CFDF037901CF3AC1
:100020000020D33020A890000BCDF7A690100BC3787
:100030000100A890000D8DF60690100D83F1103E78A
:10004000470231070 3E76F5AEF1D2D36AB13A100AE
:100050000000A0650100A032A1F971BFABEF092D200E
:10006000 0CEF821FEF4300EF3601910813EF700190
:10007000 3614143111117501169900 16D709B2C240
:10008000A09510A0C6C2A0A10000A0F3F039130DE6
:100090003711DA3A138927AA717F10279FEFC82CEE
:1000A00071FD1327EB71F70227853C1101F09906CA
:1000B00017DF01F038B02271DF123002067501CE71
:1000C00071FE023C1275B0EEC47100C5FE6D0A00EF
:1000D000C4A0C4CA91101220623412D73802067527
:1000E0001CE9101 02890000CAD7059902CED955E7
:1000F0003D1211B0EDC47100C5FE6D0A00C4A0C46C
:10010000C8912012890000C8D73171CF1291041113
:100110003811093E9C0671FEA791089D36140EA168
:100120008401C4B2C4C69104C6C6C4C6F0A1860187
:10013000C4B2C4C69180C6C6C4C6F0690100C889ED
:10014000000CAD72F35F41F36140FA18401C4B2A2
:10015000C4C671FBC6C6C4C6200DA18601C4B2C404
:10016000C6717FC6C6C4C699FFEED701F071FB11F8
:10017000914013F0690100CA3811069101A7910856
:100180009D36140EA18401C4B2C4C671FBC6C6C498
:10019000C6F0A18601C4B2C4C6717FC6C6C4C6F08B
:1001A0003C1101F03B122BB0D1C47106C49904C4B8
:1001B000DF0B9906C4DF01F0B10FC42003B103C403
:1001C00070ABC49900C4D713690100CC890000CC7E
:1001D000DF01F037F4FC81084012F0A1A000CCF060
:1001E000A18601C6B2C6C43E140AA18401C6B2C625
:1001F000C41905C43411113901 0E39010B3DC4047A
:100200071DF11F0912011F035C4263D114899009D
```

```
:100210000BD713B00CC671E0C69900C6D70C9180FD
:100220014713F02202D79010BF0B0D00B79200C16
:10023000F035112299000BD7EDB00CC671E0C699CC
:100240000C6D7E6717F1491400231010638010C3E0
:1002500091800295201191C00CB0D00B3.11213D37
:10026000111E36021B71BF02B0F4C47118C499008C
:100270000C4DF0D9908C4DF099108C4DF0891801309
:10028000F0912013F0914013F0A18601C4B2C4C6CE
:1002900036C61B9101139900E4D705EF5C002003DB
:1002A000EF610099FFCEDF037501CEE7BFFD30138C
:1002B000FA9900E4D705EF4B002003EF3C009914B6
:1002C000CED918B100CE890000C8DF0669010C888
:1002D00027D9B100E5A12003C827D0B100CE750110
:1002E000E5A12003C83F12C39900E4DF0898E5E4C4
:1002F000D90391401291101327B1B2C2C69108C61A
:100300000C6C2C6F0B2C2C671F7C627F4FDFDFDFD38
:10031000FDFDFDFDEF242AA1000010A19001C2A166
:100320008B01C0A19301E2B180DCC6E2DCB14014D4
:10033000A10380E2B2E2DC39DC2AB194DEC6C2DE7F
:10034000A18301DCB143DEC6DCDEA18801DCA13083
:1003500000DEC2DCDEA18601E2B2E2DC35DC039124
:100360002011201AB10014B114DEC6C2DEA10006AD
:1003700016A18401DEB2DEDC30DC03912011B1F085
:10038000E2EFB429EF9029A1F900BEB100DEC6BEAC
:10039000DEB100CEA12003C891C00CB10002A100C3
:1003A0000012A1000018EF9B29A16611DCA138EE14
:1003B000DEB2DCE0B2DEE29900E2DF7298E2E0D782
:1003C0000A650100DC650100DE27E6A16611DCA1FB
:1003D00038EEDEB2DEE0C6DCE09900E0DF15EF3C8F
:1003E0002AB2DCE298E2E0D74A650100DC650100050
:1003F000DE27E0EF5429B100D4EF1B2AB101D4EF7E
:10040000152AA11211DCEF7729A12711DCEF702941
:10041000A13C11DCEF6929A15111DCEF6229A16532
:1004200011E2B2E2DC71FEDCC6E2DCEFEF299140C2
:1004300010200571BF102000A16511E2B2E2DCB10D
:1004400000D430DC03B101D4EF0229B110D332D192
:100450009B104D331D103B102D3B0D315EFB7281A
:10046000A1000004B100F7B10006B10007B17109A5
:10047000B10008B101F6361426EFFE2836F405EF78
:10048000B3282003EFAB28EFF028EFED2871EFF150
:10049000A18D01E2B2E2DC38DC089110F12003E723
:1004A000FC019101A7910213EF7828717F123007A8
:1004B00003E707033411143D1403E7FE02A13000E3
:1004C000DCA18801DEC2DEDCE7F002A18801DEA14A
:1004D0000200DCC2DEDCB2C0DC71BFDCC6C0DCA165
:1004E0008301DEB2DEDC9140DCC6DEDCEF55283174
:1004F000110F3A020C3B0209EF1629EF890BE71D99
:10050000004341333D71EF13EF0729EFAB28EF2829CF
:1005100036C183CF41271BF12B100E5A10041DCA3
:100520003AD1039104D120563D11EBB2C0DC71BF2A
:10053000DCC6C0DCA18301DEB2DEDC9140DCC6DEBD
:10054000DC34F40C33F4093F1403360203E7F703F9
:10055000320118371415310112EFB528A10041DC22
:100560009900E4D704A10044DC201337142D38018E
:1005700022310127EF9A28EF3028A15344DCA1F95A
:100580000000BEC6BEDD650100BEC6BEDC650100BEA4
```

```
:10059000E74303310105EF782827CA34F103E70167
:1005A000FFB2C0DC3DDC15A19101DEC6DEDE91802C
:1005B00012B101E2EF752837DC0A273071BFDCC6C3
:1005C000C0DC2728B102E2EF62283FDC23B103E25E
:1005D000EF59283FDC1FB112E2EF50283FDC1BB17E
:1005E0002AE2EF47283FDC17B2C0DC35DCFA27CC23
:1005F000B10215200DB104152008B110152003B16A
:100600002C15B107D2B180CDB015E2EF1E28EF87CF
:1006100027EF7E27E0D2F1B015E2EF0F28EF782721
:100620003FDC0227C3B0CDE2717FE29941E2DF08EF
:100630009961E2DF03E76AFEEFD627EF5727B0CCD8
:10064000E2717FE29954E2DF139974E2DF0E992F91
:10065000E2DF06EFE227E749FEE79202B0CDE2943F
:10066000CCE235E20227EC71C9D13FCD0837CC1579
:1006700035CD1520063FCC083DCD0D9120D1200869
:100680009130D120039110D1B015D3990415DF0812
:10069000D9099106D1E7C4019104D1E7BE01B2C0E6
:1006A000DCB0DCDD711FDC90DC149101A79102133A
:1006B000EF7026717F12341103E7FF0031110C3AFD
:1006C00002093B0206EFBF09E7530234143371EF0E
:1006D0001471F9D1B11015B110D3A18801DEA2DED9
:1006E000DE893000DED70B9106D1B10215B102D3FD
:1006F000200F896000DED7099104D1B10415B1043F
:10070000D333142671F71471CFD1A18301DEB2DE89
:10071000DE33DE0E3DDE083CDE109120D1200B3CA6
:10072000DE059130D120039110D1321402206134C2
:10073000132171EF13EF80263612B3CF41271BFAB
:1007400012B100E5A10041DC3AD1039104D1202887
:100750003D11EB34F40C33F4093F1403360203E784
:10076000E501320128371425EFA626A10041DC99C6
:100770000000E4D704A10044DCA1F900BEC6BEDD65DB
:10078000000100BEC6BEDC650100BEE74901E70EFF01
:10079000EFBD259941DCDF089961DCDF03E7FEFE50
:1007A000EFAD259954DCDF109974DCDF0B992FDC59
:1007B000DF03E7E9FEE73601E7A1003007223F113A
:1007C0001F34131C71EF1371FE13EFEB25EF682636
:1007D00036120D71BF12B100E5A10041DCE79EFDAC
:1007E000717F1231110C3A02093B0206EF9808E7BB
:1007F0002C01EFA62538DE083F131B3613BD20263B
:100800009180129941DCD724EF902538DE0B3F13FD
:1008100053613F42010E72E019954DCDF3E992FA2
:10082000DCD798E7C800EF5517E7F2009961DCDFE5
:100830001035140BA16000DCA18801DEC2DEDC27CC
:100840007AEF572538DE083F13CC3613F427D799B3
:1008500074DCDF08992FDCD7E6E79200A1F900BE2F
:10086000EF382538DE083F13AD3613F427B898E784
:10087000DCD70FA10A00D89180103F10FDEF1B2597
:100880002054990DDCDFD998E9DCDF1C9920DCDFEE
:10089000CF98E8DCDFCAEF8125892201BEDFC1C61F
:1008A000BEDC650100BE27B8B0E9E29920E2D90AB2
:1008B00089F900BEDF15690100BE31F1A3B120DC6A
:1008C000EFC924B0E9DCEFC324279531F192B1548C
:1008D000DCEFB824278A892201BED7099102010EFE4
:1008E000E424E76B0071FD10B100DCC6BEDC3910FA
```

```
:1008F000EEA1F900BE381014B2BEDC650100BE994D
:10090000000DCD71F33101771F710204471FE10EF71
:100910000B424A1F900BEB100DCC6BEDC2032EF89F0
:1009200024202D9926DCD70FB2BEDC650100BE99CC
:100930000000DCDFAB918CDCEF20003F130A3E1302A6
:1009400027B3EF391627D7717F13EF3116E7C4F9B4
:10095000361403E7FDFCE759FE009923DCD703E7D3
:100960005454992BDCD703E74C54B0DCDE7180DEA5
:100970009900DEDF0220B0992CDCD701F09942DC2F
:10098000D703E736019945DCD703E73E019946DCFA
:10099000D701F09949DCD703E740019951DCD7032F
:1009A000E76302994CDCD703E71C02994DDCD703BF
:1009B000E734029953DCD703E75B029954DCD70391
:1009C000E785029950DCD703E78102993FDCD70322
:1009D000E77D02993DDCD703E782029956DCD70315
:1009E000E7B0029958DCD703E7B8029959DCD7037E
:1009F000E77103995ADCD703E702049948DCD7036F
:100A0000E71B05994FDCD703E728059944DCD7039A
:100A1000E7070C9941DCD703E75F0B9943DCD70369
:100A2000E7CC06910110F099CADCD703E7A8029938
:100A3000CCDCD703E7BC0299CDDCD703E7C402992D
:100A4000C7DCD703E7F20299D0DCD703E7050399A7
:100A5000C3DCD703E71D0399C4DCD703E72D039953
:100A6000D3DCD703E7460399D2DCD706361448E730
:100A7000520399D8DCD703E75A0399C6DCD710B0E4
:100A8000D1E07136E0EFC22271C9D190E0D1F09986
:100A9000D7DCD703E7F20499DADCD703E7850399BB
:100AA000D4DCD703E7FE0499D6DCD703E7500699D8
:100AB000D9DCD703E7A50A910110F0EFE0229900F5
:100AC000DCDF04914001F071BF01F0EFD02299000A
:100AD000DCDF049102F1F071FDF1F0EFC022990426
:100AE000DCD9383ADC3A30DC2F31DC283E1009EF13
:100AF0000C23A138EEE02007EF2522A16611E0B219
:100B0000E0DC9900DCDF09EF8222650100E027EFDD
:100B1000EF0D22F0EFE022F031DC01F0EFD122F016
:100B2000EFFD21A1788BE0EF6522A10380E0B2E028
:100B3000D4A10000E031D404A10200E0EF1200A132
:100B40000400E030D404A10600E0EF0400EFD0215F
:100B5000F0A1708BDC64E0DCA2DCE0B2E0DC9900A8
:100B6000DCDF09EF2622650100E027EFF00000003E
:100B7000898B978BA78BB78B434F4E46494755526E
:100B80004154494F4E3A20200053455249414C2090
:100B90004D4F44452C2000504152414C4C454C2077
:100BA0004D4F44452C20004E45445524E414C2057
:100BB00048594252494400455844525244E414C20F0
:100BC000485942524944400071FCBBEFD12130DC0D41
:100BD00031DC059103BB200B9101BB200631DCF811
:100BE0009102BBEF2522F071F3BBEFB12130DC0D98
```

```
:100BF00031DC05910CBB200B9104BB200631DC03DA
:100C00009108BBE70522EF95219900DCDF049104F0
:100C1000F1F071FBF1F0EF8521991BDCD104B11CDF
:100C200018F0990DDCDF1D990FDCDF189911DCDF5E
:100C3000139913DCDF0E9914DCDFJ99918DCDF044B
:100C4000B0DC18F0B10D18F071DFF1F09120F1F087
:100C500033F103EFCA20EFB820EFC420F0EF3E21BC
:100C6000990B18DF1D990D18DF24991C18DF20EF50
:100C70002F21C6E2DC9900E4D704EF8E20F0EF8745
:100C800020F09931DCD10899FFDCD90327E1F091FC
:100C90000110F0EF08219900DCDF049108F1F071F8
:100CA000F7F1F0EFF820718FBB9904DCD9159904A6
:100CB000DCDF149903DCDF139902DCDF129901DC1D
:100CC000DF11F0910110F09170BBF09160BBF091D9
:100CD00050BBF09140BBF0EFC4209900DCDF0991DC
:100CE0001F4B101DCE7030071FEF4A10040E0C6AD
:100CF000E0DCF0EFA8209900DCDF04910401F07142
:100D0000FB01F071FC01EF952030DC1C31DC0E7131
:100D10007F143E1404910110F0910301F03E14047D
:100D20009101l0F0910101F031DC0D717F143E143E
:100D300004910110F0910201F0713FD1EF5F20307A
:100D4000DC0B31DC0491C0D1F09140D1F031DC03F7
:100D50009180D1F0EF47209900DCDF049180BBF057
:100D6000717FBBF0EF37209900DCDF049180F4F055
:100D7000717FF4F0EF27209900DCDF0A9120F43432
:100D80001101F0E7A61F71DFF4E79D1F717F147159
:100D9000E7F4EF092030DC0E31DC07717F14911885
:100DA000F4F09108F4F031DC039110F4F0EFEE1F51
:100DB0009900DCDF099140F43C1106E7771F71BF11
:100DC000F4E76E1FEFD71F9900DCDF049104F4F005
:100DD00071FBF4F071CF01EFC41F30DC1931DC0B73
:100DE0003E1404910110F0913001F03E1404910181
:100DF0001F0911001F031DC03912001F0EF561F4B
:100E0000EF141FB0D1D67136D6EF921F38DC08B17F
:100E100000D4EF381F2006B101D4EF301F71C9D1C3
:100E200090D6D1F03E1004EFD41FF0B2BEDC993062
:100E3000DCD71C650100BEB2BEDC993DDCD706A143
:100E40001211E2205AA11211E26902008E2050994B
:100E500031DCD712650100BEB2BEDC993DDCD7E5BE
:100E6000A12711E220399932DCD712650100BEB208
:100E7000BEDC993DDCD7CEA13C11E220229933DCC7
:100E8000D712650100BEB2BEDC993DDCD7B7A151D7
:100E9000011E2200B993DDCDFA6A11211E2200465CE
:100EA0000100BEB100DEA0BED4991EDED94CB2D482
:100EB000DC993DDCDF449900DCDF26A1058FE0B240
:100EC000E0DD9900DDDF0B98DDDCDF0C650100E083
:100ED00027ED650100D427D67501DE650100D42712
:100EE000C8B100DE991EDED915B2BEDC9900DCDF88
```

```
:100EF0000DEF531E650100BE27EA910110F0B1000D
:100F0000DCEF431EF0543031323334353637383964
:100F10002C575021403B52232A41424344400EF7D4D
:100F20001E9900DCDF03E72A1EEF2A1EEFE81DEF03
:100F3000481EF0EF681E3911453812063C11J3E7D0
:100F400040009900DCDF25B0D1DC7106DC9906DCBD
:100F5000D71A91889EEF9110359D03E7C40EEF3AA2
:100F60001E30DEF498E8DCDFEFE7311038010F398E
:100F7000010C381203E7AA0E71FE12E72008910156
:100F800010F0910810EF371EF0EF121E9900DCDF11
:100F9000069901DCDF08F0B100D4EF7A1EF0B10150
:100FA000D4EF731EF0EFF61D9908DCD9243ADC1259
:100FB00039DC0938DC223BDC2233DC1930DC123826
:100FC000DC1C39DC0630DC1938DC1930DC1938DC83
:100FD00019910110F0E79C00E7EE00E7F100E7004F
:100FE0001E70301E70401E7EB00E7EE00B100B120
:100FF000910111B10AD87100D9FE6D6400D89180B9
:1010000010EFE50F3911093F10FA914013E73A0E3E
:10101000036F405EF1F1D2003EF171D717F10A1008F
:101020000D83AF22A3DF2273EF2249900F3D7097C
:10103000910402EFEA1CE7FF0D71FB02B0F3D471DB
:101040000D5FE6D6400D4A0D4BC91080227E499B9
:101050000F3D70A910402EFC61C910810F071FB4F
:1010600002B0F3D47100D5FE6D6400D4A0D4BC915D
:1010700080227E331110FA10000BCB2BEDC9900C9
:10108000DCDF04910110F071F30271FC11EF590FD4
:101090003DF2053EF2022009EF851CEFA01CEF7F18
:1010A0001C71FD11EFD31C36F4083C1105EF851CB3
:1010B0002003EF7D1C38F2073EF204B100F2F0B1DC
:1010C0000F2EF911CEF4F1CF09101F2E71EFF912F
:1010D00040F2E718FF9110F2E712FF9120F2E70CBF
:1010E000FF9104F2E706FF9101D1F071FED1F0719A
:1010F000FBA6EFA91C38DC039104A691089DF0EF34
:101100009C1C371104910110F0EF141CA17992E09E
:10111000EF7C1CEF0A1CA18992E0EF5A1CA1F100A0
:10112000E0EFE402A1C192E0EF4C1CB1E4D4710005
:10113000D5A10400D6B108D8EFB603A12800E0EF8E
:101140004D1CEFDB1BA10193E0EF2B1CB104D6B1CA
:101150005D8EF9C03B1F1D4B12CD6EFB61BB1F298
:10116000D4B134D6EFAD1BB1F3D4B13CD6EF9E1B56
:10117000A12800E0EF181CEFA61BA14193E0EFF6B9
:101180001BB1F4D4B104D6EF7803EF7503EF72030B
:101190007501D4EF6203EF5F03EF6603A12800E05F
:1011A000EFEC1BEF7A1B3E1006EF521CE7BF00EF7F
:1011B0006E1BA17193E0EFD61BEF641BA18992E037
:1011C000EFB41BA10111E0EF6302A19593E0EFA63C
:1011D0001BA10011D4EF3403A12800E0EFB01BEFF6
:1011E0003E1BEF3B1BA18393E0EFA31BEF311BA141
```

```
:1011F0008992E0EF811BA10A11E0EF3002A19593E3
:101200000E0EF731BA10911D4EF0103A12800E0EF67
:101210007D1BEF0B1BEF081BA1DD93E0EF701BEFB5
:10122000FE1AA1F093E0EF4E1BA11211E2EFFB02B8
:1012300099FFDCDF3DA1F693E0EF3B1BA12711E214
:101240000EFE80299FFDCDF2AA1FC93E0EF281BA165
:101250003C11E2EFD50299FFDCDF17A10294E0EF29
:101260000151BA15111E2EFC20299FFDCDF04EFA6CA
:101270001AF0EFA21A910110F0414354495645204B
:1012800050524F46494C453A004230204530204CA0
:101290003120 4D302051302056302058302059 30E8 
:1012A00020264330202644302026473020264A304E
:1012B00020264C3020265030202658302026593009
:1012C0000053303303A303030205330313A30303003
:1012D000205330323A303030205330333A303030CF
:1012E000205330343A303030205330353A303030BB
:1012F000205330363A303030205330373A303030A7
:1013000000533 0383A303030205330393A303030B2
:10131000205331303A303030205331313A30303090
:10132000205331323A303030205331343A30304863
:10133000205331363A303048205331383A3030304B
:1013400000533 2313A303048205332323A3030484C
:10135000205332333A303048205332353A3030302F
:10136000205332363A303030205332373A3030481A
:10137000000535 44F5245442050524F46494C45204B
:1013800003 0A0053544F52454420 50524F46494C36
:101390004520313A00533 0303A3030302053313428
:1013A0003A303048205331383A303030205332 31DF
:1013B0003A303048205332323A303048205332 33BA
:1013C0003A303048205332353A303030205332 36BC
:1013D0003A303030205332373A3030480054454CA0
:1013E0004550484F4E45204E554D4245523 3A00C8
:1013F000265A303D2000265A313D2000265A323DE3
:101400002000265A333D2000B2E074650700E0B2A8
:10141000E075650100E0B2E076650100E0B2E077DA
:10142000650400E0B2E078A1F100E0201FB2E074B2
:10143000650200E0B2E075650100E0B2E0766501AA
:1014400000 0E0B2E077650300E0B2E078367803B1FF
:101450003129317403B1312C307608317608B1333B
:101460002F2003B1322FB076DC1802DC7103DC745C
:10147000DC32327403B13135337403B13138B076B4
:10148000DC1804DC7107DCDF037903DC74DC3B3738
:101490007503B1313E357503B13142B075DC1803C7
:1014A000DC7103DC74DC46B077DC1806DC74DC4AE3
:1014B000307503B1314E327803B13152377603B112
:1014C0003156B078DC1804DC7103DC74DC5A89F125
:1014D00000 0E0D70FA16511E0B2E0DC30DC08750157
:1014E0005E2003B1005BA12800E0EFA218EF3018E6
```

```
:1014F000F0EF0400E0D8FAF0EF13187501D4750886
:10150000D6F0EF0F187501D47508D6F0B104D6EFF8
:10151000E6FFEFEDFFEFE0FFEFE7FFEFE4FFEFE1C6
:10152000FFEFD4FFEFD1FFEFD8FFF0A12D0064B1A2
:101530000DE991EDED705B100DC2008EFF0179918
:10154000FFDCDF17C664DC7501649900DCDF02276D
:10155000E1A12800E0EF3718EFC517F0EF3F18A121
:101560006511E2B2E2DD9900DCD70571FEDD2003F2
:101570009101DDC6E2DDEFA718F0EFD617A100005C
:10158000D4A13C00D89180109110A837100CEFAF77
:101590000230DEF771E7A8E7F001A12800D89180BA
:1015A00010371014EF990238DEEAB118E2EF88170D
:1015B00030B0EE7501D527E9A12800D891801091AF
:1015C00018A8371008EF780230DEF727C7A12800E7
:1015D000D89180103710l4EF660238DEB7B118E2E8
:1015E000EF551730B0EE7501D427E9A11E00D89150
:1015F0008010371010EF480238DE99990AD5D9F2D9
:101600009914D427ED71E7A89102A7717FF1EF211A
:1016100017B120B9EF1A02E7CE013311049101107E
:10162000F061C3FDA69104A68104021271FD12713E
:10163000FE10310105300102200C3A01093012116F
:101640007lFE12E73200EF0A17200C910110E73902
:101650001EFFF163CBB0BEF5C049901DCD719E7E7
:101660002801EF7D049901DCDFF59902DCDF09EF49
:101670006217910810E712013A010EEFC20138DE3D
:10168000F4B2EDC9900DCD703E71201650100BEAD
:10169000993BDCD710310106380103E7E60071FB06
:1016A00012910112F09950DCD7069120F1E7D40095
:1016B0009954DCD70671DFF1E7C9009952DCD71BDA
:1016C000B2BEDC9900DCDF06650100BE27F2EF56F2
:1016D000049900DEDF0220B2E72AFF9957DCDF22FF
:1016E000992CDCDF022051B0ECD87100D9FE6D647A
:1016F0000D89180103F1002208AEF430130DEF5C0
:101700002088EF2C01EFE6023902189901DED7029A
:10171000201E9902DED701F09903DED708EFBB1631
:1017200091081020659904DED7DBA10000E2205467
:10173000EFA116910810205299210CDF02201CEF46
:101740004416A13200D89180103F10FDEF3416A14D
:101750003200D89180103F10FD20299940DCD70C31
:10176000EFC4039900DED702201A201E9953DCD75C
:1017700103E1008EF8716910810200EEF7004201D
:1017800003EF190538l003E7EEFEB2BEDC9900DC6A
:10179000DF06650l00BE27F271FB12E7FF0771FB50
:1017A00012EF671630070FB100A4911007910207DE
:1017B000EF7E00E7C548EF780035BB0636BB03E790
:1017C0004001EFDD009901DCDF4F9902DCDF589921
:1017D00003DCDF459905DCD740EF56159180F171A8
:1017E000FDA7B100B9EF490071E7A891041091403D
```

```
:1017F0009C650100A031A1099120ABEF06E871DFE3
:10180000AB371015EF390038DE0F3311E438011E05
:10181000390118717F10E70906300703E7B04AEF73
:101820009D15910810276330070 3E7A24AF0E76689
:1018300005B0EBD87100D9FE6D6400D8918010F02E
:101840003E14053A1440201E39010CA18501DEB278
:10185000DEDC38DC3A200F31010C38010937020692
:10186000717F029140133E1307371308B102DEF077
:10187000B101DEF034F40B3BF40836020571BF020F
:1018800027EEB100DEF071FB14A18A01DC2004A177
:101890008001DCB0E8DFB2DCDE98DFDEDFD6B1014C
:1018A000DEF0B0A6DAB0DAA6717F03B0EDD4710035
:1018B000D5FE6D0A00D4A0D4C8B1F0E2EFD2013851
:1018C000DC3F39DC3C3F1004B103DCF0EF71FF3842
:1018D000DE0731DE16B102DCF0B101DCF03F03C5FA
:1018E000B0DAA69503A691800327C0B130E2EF4796
:1018F0001430B0E9690100C8890000C8D7C7B10534
:10190000DCF0B0A6DAB1F0E2EF860138DC0731DCBA
:10191000AB0DAA6F0B0DAA6E7FEFE38B02133A8A6
:1019200089518A8B0DAA627DC3F030E918003B013
:10193000DAA69103A6B0A6DA27CB717F0327E2B11E
:1019400014C8B130E2EF490138DC0731DC0AB0DA03
:10195000A6F0B0DAA6E7C1FE30B0C3E0C8E433A811
:1019600023EF69009903DEDF0F38DEE631DE04B0D5
:10197000DAA6F071E7A8200CEF6014910810B0DA35
:10198000A6E706FEB0EDD47100D5FE6D0A00D4A026
:10199000D4C83F1009B103DCB0DAA6E77BFEEF9FA5
:1019A000FE38DE0A31DE10B102DCB0DAA6F0B10199
:1019B000DCB0DAA6E762FEB130E2EF7B1330B0C4F0
:1019C000690100C8890000C8D7C8E70CFE9118A8B3
:1019D000B106E1B1F0E2EFB80038DC0731DC0CB160
:1019E0002DEF0910202B101DE20A2E0E1E59118F1
:1019F000A871FD02A19001D4B100D6B100CEA10022
:101A000000C8A19001CAB101E03F1005B101DE207C
:101A10007CEF2CFE30DE059102022071B130E2EF46
:101A2000161369010 0CA39D604690100D430D60AF8
:101A300088CAD4D70538B0022035890000CAD70239
:101A40002027308004650100C838D6079103D66955
:101A50003C00D4B0E17101E194E1E0DF03750135
:101A60000CEB0B0E07101E027A089C800C8D905B1A7
:101A70000DE20199907CED90A9904CED9F1B10414
:101A8000DE200A9915CED10227E5B103DE71E7A861
:101A9000F0A19101DEB2DEDE30DE07E0E2F3B1005C
:101AA000DCF037100DEF98FD38DE0731DEE3B102D0
:101AB000DCF0B101DCF09902EAD906A1C800D82017
:101AC000BB0EAD87100D9FE6D6400D89180103F48
:101AD0001004B100DCF0EF67FD9900DEDFF1B10129
:101AE000DCF09118A8B1FFE2EF4D12A1F401D891FA
```

```
:101AF0008010A16400C83F1005B100DC2025EF3F35
:101B0000FD9900DEDF05B101DC2018B130E2EF27DE
:101B10001238B00227DC690100C8890000C8D7D696
:101B2000B102DC71E7A8F0A10000C8A10000D4A1B7
:101B30000000D6B100CE9118A8EFF5FCB1FFE2EF9E
:101B4000F611371057EFF8FC9900DED758B130E2A4
:101B5000EFE51130B0EC91800337104089F401C8F3
:101B6000D95589F401D4D946EFD5FC9900DED73593
:101B7000B130E2EFC211650100C838B00C65010058
:101B8000D43703D5717F03200A650100D63F03C90E
:101B9000918003A10000D47501CE27BDEF4312B19F
:101BA00001DE91081071E7A8F0EF2F1227F1B100C4
:101BB000DE27F2A10000D489B400D6D90DA100001F
:101BC000C8A10000D6B100CE278F9907CED9DA3749
:101BD00010CAEF6BFC9900DED7CB38B0D665010098
:101BE000D489F401D4D9C7B130E2EF4B1127E0EF2B
:101BF0002E11B2BEDC993DDCD721650100BEB2BE1C
:101C0000DC650100BE9930DCDF119931DCDF12990F
:101C100032DCDF139933DCDF142077A11211E220CC
:101C200010A12711E2200AA13C11E22004A15111C8
:101C3000E2B100DEA0BED4A11701D698D7D5D93124
:101C4000DF02200598D6D4D928EFE31099FFDCDF16
:101C500041C6D4DC650100D49900DCDF3F3AF10FC6
:101C6000A0E2DAB0DED2EF2311B0D2DEA0DAE227B2
:101C7000C6EFBB1099FFDCDF199900DCDF143AF1E5
:101C8000FA0E2DAB0DED2EF0211B0D2DEA0DAE2CB
:101C90027DFB100DEC6BEDE910110F0F03DF1039A
:101CA000E759009930DCDF0AD1079939DCDF03D12D
:101CB0001F07930DCD703B10ADC3FBB0EA1240070
:101CC000DEA11800E0A1E001E2200CA12800DEA1C5
:101CD0001400E0A1E001E27100DD910413EFA61011
:101CE000A0DED8EFAA00EF9A10A0E0D8EFA100E0A4
:101CF000DCEBA0E2D8EF980071FB13F09930DCDF49
:101D0000027D1079939DCDF20D11EA17A9DE0A2E01E
:101D1000DE9950DEDF11650200E098DEDCD7EFB01F
:101D2000DFDC9130DC2001F0B0EFDB7932DBB11E7B
:101D3000DA9909DBD1087506DA790ADB27F3990409
:101D4000DBD1087503DA7905DB27F39902DBD103D0
:101D50007502DA7100DB71F8A8910413A0DAD8914A
:101D600004A6B0DCA9EF28009102A8B100A9A0DA6E
:101D7000D8EF1C0071FB13F00000410B420C430D27
:101D8000440F230E2A0A50165217541857190000F0
:101D90009180103F10FDF0EFEB01B100CE910102F8
:101DA000EF8F0F9110A73D01083C010571BFA720DF
:101DB00039140A791089DEFF20132F405EF630F04
:101DC0002003B0F5CF390106300103EF5B1031017C
:101DD000C380109370206717F02E7410035113ED8
:101DE00099FFEEDF033211293AF424A18601DAB219
```

```
:101DF000DADA3CDA08EF2E0FB0F5CF2012A1840119
:101E0000DAB2DADA39DA089900CFD703EF140F27FC
:101E1000BDEF89013901D6EFA50F910810F0EF7CA5
:101E200001F0EF6001B100CE910102EF040FEF0766
:101E300010A1A000CC71F712EF7101B1000A71DF9F
:101E400014EFDF0E71F7133313FD36F4063BF2087F
:101E5000391105EFDC0E2003EFDA0E71F71336139C
:101E600017EF1A0134F40A3BF4073D110471F7101F
:101E7000F0EF4B0F910810F035130971FE1071F758
:101E800010E7FC00371301F034F103E7BCFF9900C1
:101E9000F0DF0220343E140EB2C0DC711FDC90DC97
:101EA00014321417200AA18501DAB2DADC30DC0B17
:101EB000EFB40098E6DCDF05B1000A208775010A5F
:101EC00099030ADF02207D208D99000ADF02201489
:101ED000717F10B0F0D87100D90901D8918010B18C
:101EE000010A206099020ADF0F3F100C99050AD7FA
:101EF000022063B1020A204C3E140FB2C0DC711FF5
:101F0000DC90DC143A140FE73A00A18501DAB2DA6A
:101F1000DC38DC02202EEF4E0099010ADF23990500
:101F2000ADF1E98E6DCDF05B1000A201775010AFA
:101F3000717F10B0F0D87100D90901D891801020BC
:101F400003B1000A3313FD3111093A02063B0203C3
:101F5000E734F1E7F4FEEF8200991EE7D708991FF6
:101F6000E8D703912014F0361406A18001DA200787
:101F700071FB14A18A01DAB2DADC717FDCF0201D7A
:101F800071DF13205671CF12910411EF9B0DEF7A80
:101F9000EEFE60DEF6E0EEF9E0EE7770E71000767
:101FA000EF3800EFB00DEF6E0DE7F80D9110113A1C
:101FB000F20A3DF2073EF20461C7FEA691089D3E7B
:101FC000140FB2C0DC90DC1471BF149140DCC6C0A9
:101FD000DC3DF2063EF203EF490DF0EF480D81388B
:101FE0001A691089DF0E71301E74B0C7F7F7F7FEF
:101FF0007F7F7F7E7E7E7E7E7D7D7D7C7C7C7B0A
:102000007B7B7A7A79797873777767675747473 5A
:1020100072727170706F6E6D6D6C6B6A69686766F5
:102020006665646362615F5E5D5B5A59585756CE
:1020300055545251504F4E4C4B4A484746454342E7
:10204000413F3E3D3B3A3837363433313D2E2D2C2C
:102050002A29272624232120E1D1B1A1816151392
:1020600012100F0D0C0A090705040201FFFEFCFB0C
:10207000F9F7F6F4F3F1F0EEEDEBEAE8E6E5E3E28A
:10208000E0DFDDDCDAD9D7D6D4D3D2D0CFCDCCCAFD
:10209000C9C8C6C5C3C2C1BFBEBDBBBAB9B8B6B553
:1020A000B4B2B1B0AFAEACABAAA9A8A7A6A5A3A283
:1020B000A1A09F9E9D9C9B9A9998979695949380
:1020C00093929190908F8E8E8D8C8B8A8A898939
:1020D000888887878686858585848483838382B0
:1020E000828282828281818181818102000301D9
```

```
:1020F00003020100000102030103000230B0033DAE
:102100009C09910FABB1000FE7C205359D3937AF80
:10211000037501AF3A9D0534B01020033CB00B9518
:102120080AF7180AF95049D201D31AF1AB100AF13
:102130003A9C143A9D083DAA0E750BAA200635AAB2
:1021400006790BAA91089DB01A85B02787B1008443
:10215000B10086FE4C848480A0827EFE4C86868000
:1021600064827E09017E377F04A1FF7F7E69701D36
:102170007E3D9E1F89FF0F7ED6118901F07EDA0B0E
:102180007501943394089120 9E2054B100940A0361
:102190007E200C309C06349C030A027E0A047E6872
:1021A0007E92DD08D60AA10000922004A1FF7F9252
:1021B0003D9E08B093AA1801AA202B513FAA84493A
:1021C0008B4B9280D6149695359280D6199900843B
:1021D000DF147901AA2008993F84DF0A7501AA91CA
:1021E000089DA10040923F9D04369D01F0A1000092
:1021F00068A100006AA10000B4A10000B6B1098482
:10220000B1007F54848486B0847E6519007EB27EDE
:10221000B5B0847E6526007EB27EB7B0867E65321C
:10222000007EFE4E7EB480648268B0867E654C007F
:102230007EFE4E7EB6806B8268FE4E7EB4806482EA
:102240006AB0867E6532007EFE4E7EB68064826A0B
:10225000E084B0090168090 16AA07084090184B0B2
:102260008584B1008565EC9F84B2846D37710695D5
:10227000FF6D75016D4500407086A086840901845C
:10228000B08584B1008565EC9F84B2846F3F87067A
:1022900095FF6F75016FB1006EB1006CFE4C6C68FC
:1022A00080A08284FE4C6E6A80688284090184FE6C
:1022B0004C6E6880A08286FE4C6C6A8064828609BF
:1022C000186A08468A0866A359D4C328D0371FB1F
:1022D0009C368C06B1000DB100B8FE4C686880A039
:1022E000827EFE4C6A6A8064827E99007FDF079955
:1022F000207FD60D20213FCD1E3B0D0A75010D20BC
:10230000163 70D1027F371EF9CB1800EB180B8B174
:10231000000D2003B1810DA1003078A100107AA139
:10232000CD0C7C190297B1008237850885FFFF84A8
:102330006501008437870865FFFF866501008649AF
:102340000020 8480D61CA07A784900208680D6069A
:10235000A100407C20 0A100307AB1049BB1018211
:102360002014B1089B4900208680DAF1A0787AA178
:102370001C077CB10C9B389C0EA1C72378A0787AEF
:10238000A1CD0C7CB10C9B37691B85FFFF786501E3
:1023900000789101 97376B1B85FFFF7A6501007A02
:1023A0009103972026376B2385FFFF7A6501007A1A
:1023B000910297309C15308212B09B8019019B715D
:1023C00089B180180 71048074809B486878744869
:1023D0006A7A76379D21359D1E3F750D33751899A4
:1023E00024B8D20A7501B8200E3B750B27F13FF2D5
```

```
:1023F00006EFCF0891099E710F97B09784B10085C1
:102400065ECA084B2848090809B359D119480AE51
:102410009903AEB080AEDF03B100AD7501ADB1017F
:102420086B100A0389C05B102822003B1048299D4
:102430000082DF33790182509B86841901869900DE
:102440084D705B1009627E7750196994096D7DFA6
:10245000B100963C860B309C05B0869527D132861C
:10246000F8B101A0B101950C0298309C030C0298C0
:10247000B09884190184949A84A0988208028294A6
:102480008284180484389C0318028471F0AB710FA5
:10249000849084AB39A0069495ABB100953D9D1016
:1024A000710384990384D7057501AD2003B100AD94
:1024B0003C9D02216BFE4C687A80A08284FE4C6AAF
:1024C0007880688284FE4C847C803D9D173F830722
:1024D000992082D207200A99E082D60575010F2043
:1024E0003B1000FB08283B08182A0827E0A017E98
:1024F000309D20349C0E0A0382A082840A03823914
:10250000110C2018A1000084A1000082200E0901F6
:102510008220090A0282A082840A02826482723FB7
:102520007305711F73200391E073647284FE4D1A6A
:102530007E80A08286FE4D757C8E80648286FE41
:102540004D3D3F908068828609286688684A08E11
:1025500090A0868EFE4D7C5184806482703C9C14D9
:10256000370E0F75010E360E09B1000EB180B8910D
:10257000109C20AC95029DFE4C6C7480A08284FE61
:102580004C6E7680648284FE4C6C7680A08286FEDF
:102590004C6E7480688286A08474A08676B10086B2
:1025A000399D022068A127007EA13400A0399E0633
:1025B000B1297EB138A0B27E87FE4C867680A0829B
:1025C00084790D7EB27E87FE4C8674806482840A94
:1025D0009F8466A084C2A084FE4C867680A08284FC
:1025E000750D7EB27E87FE4C867480688284751A73
:1025F000A00A9F8466A084C2A08495BA0399E0330
:102600009957A0D21B7916A075027E27A9A1280090
:102610007EA13600A0399E9EB12A7EB13AA02796AF
:10262000B02085B02E87FE4C868480A0827EB021AB
:1026300085B02D87FE4C86848068827E3F7F1F890F
:10264000027ED60BB100B291049EB100B32024EB
:102650007501B23A9EF591049E7.01B32016B10042
:10266000B28900FE7EDA0571FB9E27DF329EDC71A7
:10267000FB9E27E5A12F007EA12E0086B286A0C674
:102680007EA099287EDF087901867917E27EDB149
:10269000227EB12186B286A0C67EA0991B7EDF086D
:1026A00079018679017E27ED31111B5103AB8499A5
:1026B0000184DF12990284DF0D990384DF0A99FFF8
:1026C00B1DF037501B120059900B1D7F1359D2621
:1026D0003B9E3330D11736B214B14AB99101A7EFFE
:1026E000E105A100008C91409C71DF9DF0309C06BB
```

```
:1026F0003DB3053DAD02202EEFC805B125B99101CE
:102700009E200DEFE405B104B9A155018C71F79E2F
:1027100091409E716E9C91609C71D69D9102A69194
:102720000lA7B11FABF07501BA30B003B100BA3EDA
:102730009C4933F21233BA0F71F7F2EF740571FE50
:10274000A771C7A691089DF0E73B01E78D02E75E00
:102750001E76904B1019FA100008C3F9C03B120F7
:10276000AAA180693CB11FAB91209C3A010B3AD1E0
:102770004B114B9F0B103B9F0204B3EB9D33DB95F
:10278000CA3CB9CA3BB9C13AB95231B9C738B00924
:1027900089080E8CD712E719013F9C059910B2DA0F
:1027A000EFB104B9A100008CF0340F076500207070
:1027B000B1000F8956018CD71B3F9C0331D10771A3
:1027C000CAA6910AA6F0B105B971CAA6913AA6A106
:1027D0000000008CF0899C018CD7F927EA39B9533075
:1027E000B9C7379E0C89B0048CDE06717E9EE7B9AE
:1027F00033B8D399900B2D7073AA20D7501A2F0BB
:102800009900B3D7CEB100A2F071EE9C71FE9D711C
:10281000FD9E91109D3D9E0791209EA1004092B18A
:102820007B9A100008C3E9E03B15FABF03601FCFE
:102830002080328D173E9E053A01022075A1550178
:102840008C71EF9EA1000072B104B9F031D1113F3B
:102850009C0334B311B108B9A100008CB100A2F0FF
:10286000379C03B100B33F9C0C36AD193E9E383205
:1028700010339D132B12BB99140A9A100008C3F9D
:102880009C03910811F0389E039140A98932008C75
:10289000DE1C3A8DA89900B3D7099902A2DF08750A
:1028A00001A2F0B100A2F0A100008CB127B9F03272
:1028B0008D07B12CB9A100008CF0B1019FA18069F6
:1028C0003C320102268EA100008CB120AAB11FABC0
:1028D00039D10B36010871C9A69119A62000391239D
:1028E000A9B121B9F03CA2047501A2F0340F07652B
:1028F00002070B1000FB02285B02F873E0126FE68
:102900004D1F5F8480A0827EFE4DA6558680648226
:102910007EFE4D1F5F8680A082A0FE4DA65584805E
:102920006882A02024FE4D5AAA8480A0827EFE4D9B
:102930001F5F868068827EFE4D1F5F8480A082A01C
:10294000FE4D5AAA86806482A0B02185FE4CA084E8
:1029500080A08286B02E85FE4C7E848068822368927
:1029600000000186D63DB100B8203B89BC078CD70357
:10297000B100A938A60C89E9078CD70671CAA691BF
:102980001AA63E0108348D05B12CB9202630B011AD
:10299000359C02275089FF008CDE069140AB916088
:1029A0009CF07501B835B805B12CB9200633AD20BF
:1029B000B12BB99109DA100008C71CAA6911AA6E5
:1029C000B140A937D103B162A936D1D5B161A9F01F
:1029D00031D1CE34B3CBB125B927D83BB9083AB9F8
:1029E000738B98626D420AE39B9148932008CDE76
```

```
:1029F0000D71CAA6910AA6A100008CB126B9F038C3
:102A0000B9233D9E0A348C0791209EA10040923646
:102A10008C0691109C91019D8946008CD7069138B7
:102A2000A6B127B9F035B3143E9E11309C0A654E0D
:102A3000127071FE9C9102A6B125B9F0368C053C4E
:102A40000F022006378C0F91029E71BFA971EFAB68
:102A500091109C91019D890E018CD70E91019C9142
:102A600040AA694E1270B1039FF0890E018CDE1EE0
:102A70009930ADDE0991089C910811912002896876
:102A80000018CD70AB128B9A100008C71FCA6F038DE
:102A9000B90220C820E73AB9F639B95032010531F8
:102AA0008D0225993E9E033DB3813B9C3135A6188E
:102AB0008978008CD70371C7A69930ADDE099108DB
:102AC0009C910811912002F09930ADDEFA91E89DB9
:102AD000309E0971FEA771FE9EEFD601204F35A6EC
:102AE000EC8978008CD7E071C7A627E139A70535B6
:102AF000B30225613D9E0A348C0791209EA10040BF
:102B00000929138A6892C018CD70971EFAB91109C5A
:102B100091019DDE098990018CD203910FAB89CC84
:102B20008CDA3791029E35AD3191299DB1039F19
:102B300071BF9C91049C71BF9EB100ADA100008C3F
:102B400071C7A671BFA991081171FB1030110C91CA
:102B50002113DF20336F2039128A6F071EC9CB10C
:102B60002FAB3E010871DBA6911BA6200671D9A6EA
:102B70009119A6B12DB939A7169104A6F039A70667
:102B800032D1033B8D2F30B00339B004B100B8F01F
:102B90007501B835B8F932D11136010E39A70B914C
:102BA000809EB104B9A154018CF091689D71FBA67F
:102BB0009108112778A100008CB103B9F033B90254
:102BC000204D3DA61E5103AB80990180DF0999027B
:102BD00080DF04B100A3F07501A3990AA3D7039184
:102BE00038A6F035ADFC274538B90EA100008C9110
:102BF0003CA69101A7B149B9F08928008CD7F97199
:102C0000FBA69138A69101A791289D71BF9CF03138
:102C1000B9D638B90A9128A671EBA6B14BB9F0998B
:102C200000B2D71271E7A69108F271BF9C91109C77
:102C300091289D71BF9EF03EF20538F202202CEFE4
:102C4000A80030112591081191101191801 1910265
:102C500010B1E09C71CAA6910AA6B108A8B108A952
:102C6000A10010929120 9EB100B9F03AF202201515
:102C70003811059138A62006EF6F0071E3A6910286
:102C80001191089DF03DF2093CF206339E23E77254
:102C9000FAEF560091409C71DF9D30110EB140B9A2
:102CA00071DFA69118A6B100A32006B148B93E9CD9
:102CB000FDF036141DA18401A0B2A080910280C64F
:102CC000A080F0361418A18401A0B2A08071FD800C
:102CD00027EDA18601A0B2A08091108027E1A186F6
:102CE0001A0B2A08071EF8027D536140EA1840117
```

```
:102CF000DAB2DAD271FDD2C6DAD2F0A18601DAB246
:102D0000DAD271EFD227F000E73A08E74308E7D9B3
:102D10000CE76A05E7180DE74C02E7F80CE7FB053E
:102D2000E7E805E78F08E79B08E7A708E7B308E7A8
:102D3000B50BE76008E76E08E72E06E71A02E79B87
:102D400002E7B503E70302E7BE0AE7E209E7620923
:102D5000E71307E7A804E7BB04E7CF07E7DA07E7CD
:102D6000EC08E7D808E7A409E71901E7F704E70248
:102D700005E71108E71608E7460CE7E007E7E9076B
:102D8000E7330CE7EF07E7F407E7A506E70D03E7EE
:102D9000460CE7B705E76606E79105E74C02E7C88A
:102DA00002E70B05E79400E76107A10000E0E748B0
:102DB00003A10200E0E74103A10400E0E73A03A118
:102DC0000600E0E73303A10800E0E72C03A10A00B6
:102DD000E0E72503A10C00E0E71E03A10E00E0E7F9
:102DE0001703A11000E0E71003A11200E0E70903B8
:102DF000A11400E0E70203A11600E0E7FB02A1181E
:102E0000E0E7F402E79F06E79208E76708E78239
:102E100004E77D05E7AE06E75809E78708E71902EA
:102E2000E71D02E72102E72502E72B02E72705E776
:102E30003002E7F004E71C00E73C05B0D31571F958
:102E4000D19902D3DF069904D3DF05F09106D1F0C2
:102E50009104D1F038071A391416B015E21903E2BB
:102E6000A19101DEB2DEDE30DEF6391403E0E2F0DD
:102E7000F0B1FFE2B2C0DE711FDE90DE1439140340
:102E8000E0E2F1F0A10810A0B2A0B035AC022091B0
:102E9000A11A10A0C6A0AB359D06339D2D71F79DDC
:102EA000A11010A0C6A0A6A11210A0C6A0A7A11490
:102EB00010A0C6A0A8A11610A0C6A0A9A11810A075
:102EC000C6A0AAA11C10A0C6A0ACA1005280C680BA
:102ED00069A1005380C6806B3D9E06A100407E2004
:102EE0003A0927EA10010A0B2A087A10210A0B200
:102EF000A085B10084B10086688884688A86FE4C0B
:102F00007E84800901820A01845483851AFE4C7EE6
:102F1000868009018208A01865483872765010080C17
:102F2000F0A10210A076A089A10010A076A08B7558
:102F30000194991094D71271DFACB10094B100885C
:102F4000B1008A0A04880A048AF0A19201DEB2DE86
:102F5000DC9110DCC6DEDCF0A19201DEB2DEDC71B9
:102F6000EFDCC6DEDCF0EFD2FDB100DEA11900DC43
:102F70007501DCC6DCDE99BADCD7F5B100F2B168C8
:102F80003DA1004092B144A6A10380E0B2E0DC3054
:102F9000DC03B104A6B121A7B102A8B100A9B130E8
:102FA000AAB12FABB120ACA11010DCC6DCA6A112D7
:102FB00010DCC6DCA7A11410DCC6DCA8A11610DC4E
:102FC000C6DCA9A11810DCC6DCAAA11A10DCC6DC7C
:102FD000ABA11C10DCC6DCACEF69FDF03DF2043E99
:102FE000F201F0B0B119EFAA02F03E1403E722009B
```

:102FF000A18501DEB2DEDE38DE04B100DEF0A180A4
:10300000001DEB2DEDC31F103EF2604717FDCB101B9
:10301000DEF0B2C0DC711FDC90DC143A1404B100A5
:10302000DEF071FB14A18A01DEB2DEDC31F103EFC8
:103030006A00717FDCB101DEF0A10300D8E7220055
:10304000A10500D8E71B00A11B00D8E71400B0EAD7
:10305000D87100D9E70B00B0D0D87100D9FE6D64EB
:1030600000D89180103F10FDF0A10000DC7100DF5E
:10307000B2BEDE9930DEDF059930DED11B9939DE34
:10308000D916650100BE710FDEFE4D0A00DCE0546A
:10309000DEE0DCB100DD27D8B100DDF03E1403E74F
:1030A0005000B0D1DE7130DE9910DEDF3B9930DEAA
:1030B000DF3B30DC039180DC31DC039580DC32DCEB
:1030C000039580DC33DC039580DC34DC039580DC05
:1030D00035DC039580DC36DC039580DC9900DEDF8F
:1030E000039580DCEF4A03F0717FDC27F79180DCE9
:1030F00027F2EF5FFDEF5D03F0EF4BFF34F101F0DE
:103100003AF1FC3BF11FA1CAB1DC64E0DCA2DCE0D7
:10311000B2E0DC9900DCD704EF0002F0EF7DFF6540
:103120000100E027EBEFE301A1E4B1DC64E0DCA205
:10313000DCE0B2E0DC9900DCD704EFCE01F0EF5B1D
:10314000FF650100E027EB30004F4B003100434F9B
:103150004E4E45435400320052494E470033004E14
:103160004F2043415252494552200034004552524F7C
:1031700052003500434F4E4E45435442203132303DB
:1031800000036004E4F20444941434F4E4450037C5
:1031900000425553359 0038004E4F20414E53574579
:1031A000520031300043 4F4E4E4543542032343 0AC
:1031B000300032343800303030004E4F204E562030
:1031C0004D454D4F52590000000047B14CB156B12A
:1031D0005DB16AB172B181B18FB196B1A2B1B2B134
:1031E000B6B1BAB149B14EB158B15FB16CB174B1B9
:1031F00083B191B198B1A5B1B2B1B6B1BAB1EF7422
:103200003EF8103EF5E00918011EF33FEEF650461
:103210009104A6F0EF90FBEF8304EF6003EF6D03E2
:10322000EF5000EF13FE3E1403EF78FB61492010CE
:10323000610000127 15F1471DF02710007B10206B4
:10324000B100CEA12003C8B100E535F403EF92032D
:1032500038010639010336F405EF4A032003EF3441
:1032600003EF02FDF030F40BA1FF7FDEB101DCC6FD
:10327000DEDCF0A1FF7FDEB100DCC6DEDCF0990D04
:1032800018DF05991C18D705B100192006EF11FBAE
:10329000B2E219B164DEEF81FAEF00FEB10ADEEFAF
:1032A00078FAEFF7FDB019DC7530DCEFEEFDF0A138
:1032B0000000E2990D18D607B018E275E4E2F09923
:1032C0000E18D704B1F1E2F0991018D704B1F2E268
:1032D000F0991218D704B1F3E2F0991518D704B198
:1032E000F4E2F0991618D704B1BBE2F0991718D799

```
:1032F00004B1D1E2F0991918D704B1D0E2F0991ACB
:1033000018D704B1F5E2F0B101E2F0B0E7DCEF8BE1
:10331000FDEF2CFDB0E8DCEF82FDF0B0E7DCEF7BE9
:10332000FDEF1CFDF0C6E2DCEF15FDF0B2C0DE35AE
:10333000DE0DB180DC31F10671BFDEC6C0DEF0B15A
:103340000000DC31F1F99140DEC6C0DEF01801CDEFAE
:10335000DAFF90DCCDF0A19101DEB2DEDE30DE04DA
:10336000E0E2F3F0EFC5FF27EDA19101DEB2DEDE72
:1033700030DEF6E0E2F3F03E1403E7D7FAB101E203
:10338000EFE6FFA18501DEB2DEDE35DEF636DEF3E6
:10339000F0361410A18301DEB2DEDC71BFDCC6DEC4
:1033A000DCEF9501A18801DC990415D911DF09EF43
:1033B0007901A13000DE2015A16000DE200F9910F8
:1033C00015D706A18001DE2004A11704DEC2DCDED1
:1033D000B2C0DC9180DCC6C0DC717FDC9140DCC611
:1033E000C0DCB015E2EF81FFA18501DEB2DEDCA119
:1033F0008001DEB2DEDCA18001DEB2DEDCF03E1454
:1034000015B2C0DC711FDC90DC143214F471FB14B3
:10341000A18A01DE200EA18501DEB2DEDE30DEDE15
:10342000A18001DEB2DECC31F106B0CCDCEF0100D0
:10343000F03E1403E71E009101A7910213B101E2CF
:10344000EF26FFA18501DEB2DEDE35DEF6A18A01C0
:10345000DEC6DEDCF09101A7910213A18001DEC679
:10346000DEDC71FD14F03E1403E71B00A18501DED4
:10347000B2DEDE30DEF6A18001DEB2DEDC31F10349
:10348000EFAEFF717FDCF0B2C0DC711FDC90DC14AA
:103490003214F471FB14A18A01DEB2DEDC31F103D7
:1034A000EF8EFF717FDCF036BB173D0210B09DDC64
:1034B00071C0DC3FDC073EDC08EF11F9FCEF29F9C1
:1034C000F0EFEDF8F071F9D1A18801DE3D021DB0F9
:1034D0009DDC71C0DC3FDC143EDC22A16000DCC25C
:1034E000DEDC9104D1B10415EF4E00F0A13000DC18
:1034F000C2DEDC9106D1B10215EF2F00F0A18001F0
:10350000DCC2DEDCB11015EF2F00F037F41C3411F3
:1035100019380116390113F1C3A69130A691089D7F
:10352000A19001D89180103F10FDF03E1401F0B23F
:10353000C2D29104D2C6C2D2F03E1401F0B2C2D2BD
:1035400071FBD227F03E1401F0B2C2D29108D2270B
:10355000E43E1401F0B2C2D271F7D227D83E140172
:10356000F0B2C2D29110D227CC3E1401F0B2C2D236
:1035700071EFD227C0B2C2D29140D227B8B2C2D224
:1035800071BFD227B0B2C2D29120D227A8B2C2D284
:1035900071DFD227A0361471A18401DAB2DAD29198
:1035A0001D2C6DAD2F036146DA18401DAB2DAD2D1
:1035B00071FED227ED361439A18401DAB2DAD29144
:1035C0002D227DE361436A18401DAB2DAD271FDD6
:1035D000D227CF36144DA18401DAB2DAD29104D2C7
:1035E00027C036144BA18401DAB2DAD271FBD2279C
```

```
:1035F000B1A18601DAB2DAD29110D227A5A1860153
:10360000DAB2DAD271EFD22799A18601DAB2DAD230
:103610009120D2E78CFFA18601DAB2DAD271DFD233
:10362000E77FFFA18601DAB2DAD29180D2E772FF9A
:10363000A18601DAB2DAD2717FD2E765FF36141DB6
:10364000A18401A0B2A080910280C6A080F03614AF
:10365000 18A18401A0B2A08071FD8027EDA1860190
:10366000A0B2A08091108027E1A18601A0B2A08025
:1036700071EF8027D571FCAC3ABB153BBB02202013
:10368000B103D270BBD2D703B101D290D2AC20101B
:103690003BBB053B110A27E83A120527F671FCAC43
:1036A00091089DF09961DCDE08997ADCD90371DF1D
:1036B000DCF0B2EDC9900DCDF06650100BE27F25B
:1036C000EF6C00361046A10011E230D404A10911BC
:1036D000E2B2E2E4650100E2B2E2F1650100E2B2C9
:1036E000E2F3650100E2B2E2F4650100E2B2E2BB9E
:1036F000650100E2B2E2D1650100E2B2E2D065010B
:10370000 00E2B2E2F5650100E2B2E2013DF405EF4C
:1037100017F62003EF15F63EF405EF15F62003EF3C
:1037200013F69900E4DF04EFDEF5F0EFDDF5F0B11C
:103730000000E4B100E5B12BE6B10DE7B10AE8B1084C
:10374000E9B102EAB11EEBB102ECB106EDB10EEE49
:10375000B15FEFB132F0B1AAF1B100F2B100F3B153
:1037600020F4B176BBB107D1B105D0B101F5B140BC
:103770001F0A10011E230D404A10911E2B0E4DCAF
:10378000EFA2FB650100E2B0F1DCEF98FB65010000
:10379000E2B0F3DCEF8EFB650100E2B0F4DCEF8415
:1037A000FB650100E2B0BBDCEF7AFB650100E2B033
:1037B000D1DCEF70FB650100E2B0D0DCEF66FB65A9
:1037C000 0100E2B0F5DCEF5CFB650100E2B001DC7A
:1037D000EF52FBF0000021022C053006310732 08C1
:1037E00033093404351236133714380339153B10B6
:1037F0004011410B420C430D440F230E2A0A501670
:103800005217541857190000A1D6B7E0A2E0DA9871
:10381000DADCDF0D650200E08906B8E0DFEED1EC0E
:10382000F0B0DBDC1903DCEF66019900DFDF2099E3
:103830001DFDF209902DFDF339903DFDF3C9904EA
:10384000DFDF4F9905DFDF629906DFDF6B2081C67E
:10385000E2DC208CB2E2DD1803DD0903DCC6E2DD28
:10386000EFD6F7650100E2C6E2DC2074B2E2DD18B3
:1038700006DD0906DCC6E2DD2066B2E2DD1801DD08
:10388000 0901DCC6E2DDEFB0F7650100E2C6E2DC6B
:10389000204EB2E2DD1804DD0904DCC6E2DDEF985B
:1038A000F7650100E2C6E2DC2036B2E2DD1807DD92
:1038B0000907DCC6E2DD2028B2E2DD1802DD0902DC
:1038C000DCC6E2DDEF72F7650100E2C6E2DC201043
:1038D000B2E2DD1805DD0905DCC6E2DD650100E2C6
:1038E000EF56F77501DEF0EFA6009900DFDF2099B3
```

```
:1038F00001DFDF239902DFDF2D9903DFDF30990439
:10390000DFDF3A9905DFDF449906DFDF472054B255
:10391000E2DC1803DC2053B2E2DD650100E2B2E232
:10392000DC0806DC2044B2E2DC1801DC203CB2E218
:10393000DD650100E2B2E2DC0804DC202DB2E2DD4C
:10394000650100E2B2E2DC0807DC201EB2E2DC180E
:1039500002DC2016B2E2DD650100E2B2E2DC08051D
:10396000DC2007B2E2DC650100E27501DE711FDCDC
:10397000A1D6B7E0A2E0DA98DBDCDF10650200E058
:103980008906B8E0DFEED1EC91FFDCF0B0DADCF0D4
:10399000B0DEDF991FDFD9119917DFD90F990FDF3B
:1039A000D90D9907DFD90B200C7908DF7908DF7969
:1039B00008DF7908DFF0B100DEC6DCDEEF7AF6F072
:1039C000A12800E2B2E0DCC6E2DC650100E06501AE
:1039D0000E29900DCD7EDF0B2E0DC9900DCDF0911
:1039E000650100E0EFB5F627EFF0A12800E264D60C
:1039F000E2B2D419B164DEEF1B00C6E2DC6501005F
:103A0000E2B10ADEEF0E00C6E2DC650100E27530CD
:103A100019C6E219F0B130DC98DE19DF02D10F7857
:103A2000DE197501DC98DE19DFF5D10227F1F0A16E
:103A30002800E264D6E2B2D419B019DDB019DC185E
:103A400004DC710FDD9909DDD9059130DD200375A6
:103A500037DD9909DCD9059130DC20037537DCC6E8
:103A6000E2DC650100E2C6E2DDF00000000000000DB
:103A70000000000000000000000000000000000046
:103A80000000000000000000000000000000000036
:103A90000000000000000000000000000000000026
:103AA0000000000000000000000000000000000016
:103AB0000000000000000000000000000000000006
:103AC00000000000000000000000000000000000F6
:103AD00000000000000000000000000000000000E6
:103AE00000000000000000000000000000000000D6
:103AF00000000000000000000000000000000000C6
:103B000000000000000000000000000000000000B5
:103B100000000000000000000000000000000000A5
:103B20000000000000000000000000000000000095
:103B30000000000000000000000000000000000085
:103B40000000000000000000000000000000000075
:103B50000000000000000000000000000000000065
:103B60000000000000000000000000000000000055
:103B70000000000000000000000000000000000045
:103B80000000000000000000000000000000000035
:103B90000000000000000000000000000000000025
:103BA0000000000000000000000000000000000015
:103BB0000000000000000000000000000000000005
:103BC00000000000000000000000000000000000F5
:103BD00000000000000000000000000000000000E5
:103BE00000000000000000000000000000000000D5
```

```
:103BF0000000000000000000000000000000000C5
:103C000000000000000000000000000000000000B4
:103C100000000000000000000000000000000000A4
:103C20000000000000000000000000000000000094
:103C30000000000000000000000000000000000084
:103C40000000000000000000000000000000000074
:103C50000000000000000000000000000000000064
:103C60000000000000000000000000000000000054
:103C70000000000000000000000000000000000044
:103C80000000000000000000000000000000000034
:103C90000000000000000000000000000000000024
:103CA0000000000000000000000000000000000014
:103CB0000000000000000000000000000000000004
:103CC00000000000000000000000000000000000F4
:103CD00000000000000000000000000000000000E4
:103CE00000000000000000000000000000000000D4
:103CF00000000000000000000000000000000000C4
:103D000000000000000000000000000000000000B3
:103D100000000000000000000000000000000000A3
:103D20000000000000000000000000000000000093
:103D30000000000000000000000000000000000083
:103D40000000000000000000000000000000000073
:103D50000000000000000000000000000000000063
:103D60000000000000000000000000000000000053
:103D70000000000000000000000000000000000043
:103D80000000000000000000000000000000000033
:103D90000000000000000000000000000000000023
:103DA0000000000000000000000000000000000013
:103DB0000000000000000000000000000000000003
:103DC00000000000000000000000000000000000F3
:103DD00000000000000000000000000000000000E3
:103DE00000000000000000000000000000000000D3
:103DF00000000000000000000000000000000000C3
:103E000000000000000000000000000000000000B2
:103E100000000000000000000000000000000000A2
:103E20000000000000000000000000000000000092
:103E30000000000000000000000000000000000082
:103E40000000000000000000000000000000000072
:103E50000000000000000000000000000000000062
:103E60000000000000000000000000000000000052
:103E70000000000000000000000000000000000042
:103E80000000000000000000000000000000000032
:103E90000000000000000000000000000000000022
:103EA0000000000000000000000000000000000012
:103EB0000000000000000000000000000000000002
:103EC00000000000000000000000000000000000F2
:103ED00000000000000000000000000000000000E2
:103EE00000000000000000000000000000000000D2
```

```
:103EF0000000000000000000000000000000000C2
:103F000000000000000000000000000000000B1
:103F100000000000000000000000000000000A1
:103F20000000000000000000000000000000091
:103F30000000000000000000000000000000081
:103F40000000000000000000000000000000071
:103F50000000000000000000000000000000061
:103F60000000000000000000000000000000051
:103F70000000000000000000000000000000041
:103F80000000000000000000000000000000031
:103F90000000000000000000000000000000021
:103FA0000000000000000000000000000000011
:103FB0000000000000000000000000000000001
:103FC00000000000000000000000000000000F1
:103FD00000000000000000000000000000000E1
:103FE00000000000000000000000000000000D1
:103FF00000000000000000000000000000000C1
:104000001AC028C036C044C052C05FC06DC07AC05C
:1040100088C092C09DC0A8C0B3C07E7EFBE2304085
:10402000180412339F9F9FFF7E7EFBE230401C04EA
:1040300012EF5F9F9FFF7E7EFBE230401404135619
:104040000DF9F9FFF7E7EFBE230401004138A1F9F9C
:104050009FFF7EFBE2304013840BAB1F9F9FFF7ECB
:104060007EFBE230401C840B77CFCFCFFF7EFBE29C
:104070003040148404CE5F9F9FFF7E7EFBE230407B
:1040800010840A129F9F9FFF7E7EFBE2360A621F9FE9
:104090009FFF7E7EFBE237CB2DEFCFCFFF7E7EFBF7
:1040A000E23C6730DF9F9FFF7E7EFBE23D33199F3E
:1040B0009F9FFF7E7EFBE23CAB281F9F9FFF00007F
:1040C0000000020040000006000000000000000E4
:1040D00008000A000C0000000E00000183000C0C54
:1040E0006301802122409090524120200C180606CB
:1040F000031800C02060C0303020C06020014D9A8D4
:10410000000000A6CD40000000005366A00000057
:104110000029B350000000014D9A80000000A6C95
:10412000D4000000005366A00000029B35000090
:104130000000014D9A800000000A6CD400000000532
:10414000366A00000029B350000000014D9A803B
:104150000000000A6CD40000000005366A00000BC
:1041600029B350000000014D9A800000000A6CD75
:10417000400000000064E0E618194C1C1BE7B3567D0
:10418000093093080 6C821B6411809308B901F6288
:104190001B48540000000656ED98661BBE6364EB0
:1041A000466537CEDF3B7CC991D8991DBB50F9DB02
:1041B000E6B90EDEEA2690A800000000CADF6B6FA9
:1041C0009DB1B074B166F9DBE76F9A8166C4338B39
:1041D00037CCED3BB7CD721DBDE82B485400000035
:1041E000656DF9B7239137CED8D83F0B37CCC3D4
```

```
:1041F0009BE76F9DBE661CD887A39BE6769DDBE69A
:10420000B90EDF0A7277C100DB48540000000006578
:10421000629C9D9D936FBBB0EA1BEEC87CF99867CA
:104220000FC1261CC398703736FBB262CC3AE40447
:10423000D1F3B7CF9986D215000000000195B7CEE50
:10424000D9D936FBBD1837CF8273E661A776F9E876
:10425000CC39BE661CDBEEC6DE8D721E8139DBE01A
:10426000730DA42A00000000032B7A34EC9BE7A30F5
:104270006F9DBB7CF99869DDBE7A330E6F998737E5
:10428000CC6DE8D72190EDF3B7CC5DB4854000004C
:10429000000656F469D937CF460DF3B76F9F330D3B
:1042A0003BB7CF4661CDF33BD1CDF33B4EF46B90A2
:1042B000C876F9DBE62EDA42A00000000032B7A3440
:1042C000ECC377CF9837CEDDBE7CCC3A9F3E6430CE
:1042D0003737CCEF4676EC8737CC86BE8C876F9D20
:1042E000BE7CCC3690A800000000C9C538BA0A6070
:1042F0008E1143E7C4EF83A80FC29C24C5301F82F0
:10430000130F32301262AFA0A413BE093084C3B4BD
:10431000086C000000005B82B64536D350000000016
:104320002DCB5B216BB6D3500000000002DC542380
:104330002058AD326000000029B350000000014E0
:10434000D9A8000000000A6CD40000000005366A0094
:104350000000029B350000000014D9A8000000C9
:104360000A6CD40000000005366A00000000029B35D8
:104370000000000014D9A8000000000A6CD400000F5
:1043800000005366A00000000029B350000000014D0E
:104390009A800000000A6CD40000000005366A00060
:1043A00000000029B350000000014D9A800000000A6
:1043B000A6CD40000000005366A00000000029B35079
:1043C00000000014D9A800000000A6CD40000003B
:1043D000005366A00000000029B350000000014D9C5
:1043E000A800000000A6CD40000000005366A0000CD
:1043F0000000029B350000000014D9A800000000A1F
:104400006CD40000000005366A00000000029B350041
:10441000000000014D9A800000000A6CD4000000054
:104420005366A00000000029B350000000014D9AD3
:10443000800000000A6CD40000000005366A0000059
:1044400000029B350000000014D9A800000000A65F
:1044500000CD40000000005366A00000000026E3544D00
:104460009500000000026E04706D90600000000274
:104470006E60A09B25C00000004DCC141364B806B
:10448000000000009B84E0A09B25C00000004DCBE4
:10449000B81B95CD9D0000000004DC41C14159B618
:1044A000048000000001374E38282B1B64E000000A1
:1044B00000026F50905056236660000000026FA04AC
:1044C000C787615B3C00000026E80FFFF30AD9B4
:1044D000B00000000137A03D6A608D970000000029
:1044E000137F05EB530C364D40000000004DF008FB6
```

```
:1044F00054530C1B06600000000026F01A3D4F98626
:1045000076C258000000009B8E0DFD514C363616C9
:10451000C0000000004D8CC3AA846C2C80000000081
:10452000A6CD40000000005366A00000000026CB2022
:1045300042A030D85300000000001362506E3C580D6A
:10454000DB01400000000026C4819D6033B601400F8
:104550000000005366A00000000026CAA1A16033B7C
:1045600060140000000004D894328B43636028000F4
:104570000000004D96408530CED8520000000014DB3
:104580009A800000000A6CD40000000004D8CC3AA81
:10459000846C2C8000000009B9A8374EA60DDB0BF7
:1045A000400000000026EE1A26A7CC33B612C000067
:1045B000000004DEC089A9F3061B066000000000026B4
:1045C000FC0BCD4F982ED83400000000137983CD1A
:1045D0004F982365C0000000004DCE1E6A7CC2B6601
:1045E000C0000000004DC80BD73E08D9E0000000070
:1045F000137D0259D9588D998000000009BD62B819
:10460000E0A056C9C0000000004DD38DC705036CA96
:104610000000000004DC41B8E0A0DB2180000000C5
:104620009B83E07051367500000000137483826D7
:10463000C9700000000137483826C9700000000129
:104640003730764D92E00000000026E075B6C84000C
:10465000000000013716DB2AC0000000005366A000B2
:104660000000029B350000000015C2F1D2F3291AA8
:10467000EDDC23482C0000000000572A742E1905A3F6
:10468000A0E821C741018CA239F968CE228190347B
:10469000168542D08E28C8E3D45A0CBB39064E6723
:1046A00019CFCB41D07311A5C0000000002B94C1B3B
:1046B000F220AAE8320741A051020ADA5E556814D6
:1046C00020A411C93BF24E3F113C824E39903BC6AB
:1046D0009D8F1041D849C7E340DA58000000002BF5
:1046E000943D2F220AAE85A150640C66E42955F949
:1046F0055A13917C7220A645EC22E3E089F4108A1
:104700001F103B88BEFE87A7032E5C3206D2B00086
:10471000000015CA2ABF220AB542D0A85A10C5025
:10472000313AAFCAAD09C62141905E413B2083CDED
:10473000C75E822E5C40EB18387F43D3718316C668
:1047400040DA56000000002B8B9A82209216854298
:10475000D093AC189350404ACC62B320B895A81AB5
:1047600082CECAA441171E103AC8B0D39281D8C8CD
:104770002696000000000AE506108823FA9064726D
:10478000C93FC4246108E93AB2AFB320B880895A3
:104790008EFC1E88822E2D904E0658758D5958C855
:1047A0002696000000000AE5020C2208FEA44190B3
:1047B0004418C5318D88308EABF0B55C64160C089A
:1047C000958ED78C3441031C1049C658550AACACA1
:1047D000883697800000000AE520BA08829D50E6DE
:1047E000EA1CCCBF418D82E829D5F830FE320B0399
```

```
:1047F0006064CAD4C64220C20E0824E32C2A864C28
:10480000AC8EDA4700000000015CA833F9100C54016
:10481000B8C0C1348213023C18AFF22179905833EA
:104820000326568E33A20818ECD46E32D3A864CA7D
:10483000C30D2D400000000570505F0882A5A8E858
:10484000320741D59031605F0A9D7F9214CC82C1BE
:10485000981932BCE3A220818E0824E32D3A864CBD
:10486000AC7E369500000000057240964411FD486C
:10487000819C881E81B0102411D57CCA8A86416132
:10488000010D58ED1039A20818E0827032D3A864E7
:10489000CAC8826970000000000AEB23B2208EAA2DA
:1048A0000C7420C68B420B1C11D57D0BD1CC82C160
:1048B000981AB1DAD06308B8EC94281961543265BB
:1048C000641934B0000000000575B282209216854A5
:1048D0002D091D441650463A0F3399058333035652E
:1048E0009E834E45C76413814B0EA1AB1D9064D2CD
:1048F000C00000000015C5EACA088211E168542D07D
:104900008FA7231A738211F671DA41905C4044AC90
:10491000B3D4759172C209D8CB0EB1A82C20C9A509
:10492000800000000002B8BD59D910432C2D0A85A182
:1049300053104934E70432ED031F20C82E1A8503B3
:10494000085DD428E832103C1835C4A15649C82166
:10495000710636958000000000AE2F56F08824EF07D
:10496000B42A16853CB8C9D53C24F7E40A19905EF0
:10497000306B0819749C50C8614C8BFC297EB24E78
:10498000032E5E41934B000000000057173D1F11054F
:10499000059E168399685F03226F57855BFC32D0C5C
:1049A0008298C47C3185F0C1482AC7418CE8319592
:1049B00064208614C831B4AC00000000571719DF1A
:1049C0008C82D4B8618BE30C79041AB243F2D4BE62
:1049D00020832207417439BF423C20881E83D05D9A
:1049E00030C5D0EB1972D4D0418DA5600000000213
:1049F000B9402FE0BB8350E0BA00BA017AC101830D
:104A000001C0D3014EE818B0C5033EA2F1202277EDE
:104A100019A5C081019EB05C401080C502348D4054
:104A20000000000005366A00000000029B350000000B5
:104A3000014D9A800000000A6CD400000000053660B
:104A4000A0000000029B35000000000014D9A800005F
:104A50000000A6CD40000C0005366A00000000029D5
:104A6000B350000000014D9A80000000A6CD40091
:104A700000000005366A00000000029B35000000000B
:104A800014D9A80000000AE08E9738EC8370C9F47
:104A90008C1C3E63CEB757B9B1F173DD70FF632F45
:104AA0002A7373615CE9B08E8FDA8A6E9522A084D6
:104AB0003177368CFCDE38C5C277CDDD7CE9B30EAC
:104AC0008FD8473737CE3371000000002B964F643
:104AD00043F8259D54693FCBE3B496633ABDFEECA1
:104AE000A7DD78EFBAE1FE3A5D3D73C5B743FDBC83
```

```
104AF000327BB7EE78443F93D90FF43E530F8F6962
104B00008ACF66F4EA5FBF6214F7F73E3AEE87FB9E
104B10007944F76FDCF0C9EB9EB9EB10DC40000084
104B20000000AE59DD1477B9DE328D27F88EF14CD6
104B300067ABDE7714FBABBF1EB479A1F77DF71628
104B4000594774633BAF8EFBC651DF7DD1DD1946FB
:104B5000FBFA62BDF7473A9771DEE653DF8FF8EB59
:104B6000B28EE8D4775F1DF78CEFBEFBEFBDCCDCD7
:104B70004000000000AE59451477DF7886FA4FF107
:104B800095E298CF57BCF329F7AD7E3D7BA341F565
:104B90001DD115BCA3BA3194513D74633BA28EE87C
:104BA000EE8CA37DFD315A3BA3F73793D7DE55DF5B
:104BB0008E78FD6F28EE8D45144F5D18CA3BA3BA61
:104BC0003BEF372E000000002B967747753B2A9B62
:104BD000FF631E73EC7B5F3C783C7073BFD5E31DB5
:104BE000E4155F8F18F27FEF2E82BCF1EBDD054BF1
:104BF000BBEFB8A8F3BA28C677467EF19DD1DF7D1A
:104C0000D1DC2FBEFE5DFD6C761F7DD1F1F9E7563C
:104C1000558F8FE39E3F51E77451A8EE8CFDE33B27
:104C2000EFBEFBCF9B970000000015D4BBEE9F9317
:104C3000FA98FE43FCC7E3F63FA679FE87B3CFE1BF
:104C4000FEF53CEF887815FCFF31FAFC87F37AE13A
:104C5000E04C83D28A27E71D9F2B3CEEB1ABEC746E
:104C60006328BDDF747715FF0F5F90F5C3E9DE0F92
:104C70008FCF067CAF1F99CEACF3BAC607D8E8C277
:104C800039B9BA66E0C000000000570AB3BBFEEFD6D
:104C900031F1FBA3C87EFFE20F3CF6715F9F51E745
:104CA000A63DDBF146A4EE7B38AAEE8EF8E28C132B
:104CB000463DA51477FC8A715E3D9DD13C12CA3AEF
:104CC0004328A75F747715FD477DD1DC3E32B9ECF0
:104CD000C7BB1ECA39E587F8F4EAB1ECEE89E316E2
:104CE00051D25152A53CDC2000000000AE097F7774
:104CF0004441E39DF75F3FF883F479DF7E7DDD7EFD
:104D000098F76FC77AA7379C5577DD0FBBC134631F
:104D1000DAC3BA5D11F459BD9DD1DD017AFEEA76A0
:104D20001721DD3BEE8EE2BFBBEFBEFC65FBEE8DD7
:104D3000ECDECEEE8B31FFC7A76BBD9DD1DD0151FF
:104D40007F753B0A7CF9FF8DC2000000000AE5BDBB
:104D50003BBA220F777DD7CFFE20F 3B9DF7E7DD9F
:104D6000D7E9BD90FC0AABC0B9C5577DD6762826D9
:104D70008DED48F74457826F6774770CE9DD484141
:104D80001E8EE8EE2BF85BEC5E8BD1DD1BD9BD9D52
:104D9000DD1667DEE3D37B3BA3B9474EEA4A2A54CC
:104DA000BA37080000000002B9667A3FFE883DDDF19
:104DB00075F3FF883A9C59DF7E7DDD7E83E77AA715
:104DC0009C71671110FDF7738D5238F4E3BA2EBA57
:104DD0008A30412E8EFB93E7EE8A219C774514772B
:104DE0004659F67EF43D68A3B9C4812FBBB2DCE31B
```

```
:104DF000EC7C312E8EFB8267EE8A24F45145145DE3
:104E00009BA80000000015CB2BE28FFFEFD38AE8B0
:104E1000F39FFC5A77C716715F9F51E61F173B94AB
:104E2000FCE38B3888DFBA3BE38953BE3883E2BEAC
:104E3000FFBBBA2BCB2CA3BEE4F5F1477DC9F8AF7D
:104E4000BA28EE8CB3EA9DC73D3BA3BBEA5947F9AC
:104E50006F4E2CDEAECA3BEE095F1477DC9FBA3B87
:104E6000A3BBB3750000000002B9618FE6FCFFE34D
:104E7000D78B21FEE677C5AEFDC3BC87B3C3B87F31
:104E8000B0FBBBE87F328A3B8779C419E43F9C774B
:104E90000FE655BF7DC1E3D9C73BBBECC7CB6EDF87
:104EA000CA31863F90FE7788C7B3BF37FB7CB7F81F
:104EB0007F3C87F37F4EFBA39D4BA1F9E5BD3BAF44
:104EC0008EBBB7F28D418FE43F9DE33BEFBEFBFF0E
:104ED0003750000000002B853C24E41B4159F9B9F0
:104EE0008E7A158B8383B3B2B34377A15C502D8B3D
:104EF00006399078583B2B8A8A1BB0CB8B8B873630
:104F000058F8B8611E170C4170F0B88ACF8A0ECAE3
:104F100018EF41E0FDCDF12A9FB76EDDEAF8B866E3
:104F20001E170C40F07833712000000000013634D792
:104F300057B5854000000004D8D35D5ED61500004B
:104F400000001363236C99800000000A6CD40000F9
:104F500000000005366A00000000029B350000000001412
:104F6000D9A800000000A6CD40000000005366A0068
:104F700000000000029B350000000014D9A80000009D
:104F80000000A6CD40000000005366A00000000029B35AC
:104F900000000000014D9A800000000A6CD400000C9
:104FA00000005366A00000000029B350000000014DE2
:104FB0009A8000000000A6CD40000000005366A00034
:104FC000000029B350000000014D9A80000000007A
:104FD000A6CD40000000005366A00000000029B3504D
:104FE00000000000014D9A800000000A6CD40000000F
:104FF000005366A00000000026C5818834FB7338935
:105000000DB5A6B968DF39C6475FA127C326429002E
:1050100000000001362CA28B24F373289DB588797E5
:105020002AB0E6DE1F45544377AC871B21400000C1
:10503000000009B165145927DB99C4ED92C3B5CA734
:105040000A5F733BD591F7AC7BB64170000000013D2
:1050500062CEEBF2364F13B64B3EB9574BA9D3D57
:105060000D1FC1BA5D320B8000000009B16775F9F0
:105070001B2789DB259704CFF67FE1E221E47F102F
:1050800074FE64170000000001362CEEBF2364F137B
:10509000B64B2E0BD3ECFA2AA47F231EA6C816000B
:1050A000000026CA52273A1D09F4E6E787A11C32
:1050B0009FE27FCB471D08B8E21C7C4413E5C9F989
:1050C000979B9D052E2A0821414CA67865C5C38370
:1050D000994CDCF0C08A6787C7069CDCF42E1C4321
:1050E0008C675412AA3D38F8F4E640B00000000185
```

```
:1050F00036529051529F6620A21E767717F679D9C4
:10510000E571E72F7103F2BFABA9D988ECF9C5E5CA
:105110001522710DD84E7FB773BE091E1E7F9BB935
:105120009443CED5B773BE9C3CF88288EE2FF2BC78
:10513000B98704AA8F4EA6F4E73642A00000000010A
:10514000365290FA9DFFC21F3EA777DFD7FD9FF32F
:10515000FB9DD83A1C7FFFFFC33FB2EFDF5389C8E6
:10516000BA09F7F75F7C1239C5975EF9F412EBEFD5
:10517000A671087D4EEFE8718419E09551E9D3E2FC
:10518000993B64280000000013652917D3BF9E22B5
:10519000FBE9FF673EF9F9FF3FAFFE07C1BFFFFF25
:1051A000CF19CFCFEEBE9C4E47F04FBFFEFBE09134
:1051B000DE79FDF7DF04FEFBE9BCC45F4FFBF83787
:1051C000C994E09551E9D3E29BE9905C00000000AE
:1051D0004D94A45F4EFBF117DF4FFB2FEEFF4E7F88
:1051E0005FFC0F837EAFEFC65FE7F75F4E2723F9C3
:1051F000477CFFBEF8247647F7DF7C13FBEFA6D28F
:105200005F4FFBF837C09FC12AA3D3BFBA77CC82C8
:10521000E0000000026CA522FA74DA4BEFBEFB99A5
:105220000D39CFEBAF81EF8F0FE873691A2FBAFA00
:105230007138F4E09DFF4EEBE091E229DD7DF03A1C
:10524000775F4E317DF7DFBE3C3E377412AA3D3B9F
:10525000BCA77CC82E0000000026CA522FA750D53C
:10526000DF7DE09E68320DF9FD7020387C787CE6A9
:10527000FD0C99D013AFA7138F4E09DFF4EEBE09D2
:105280001E229DD7DF03A775F4E317DE09F0F8F0BF
:10529000F895904AA8F4ECFA9D3990580000000067
:1052A0004D94A45F4E4184BEFBE186839DDCFEFEEF
:1052B00012C7DF1F9DDA0C99FD55F4E271E9CA3778
:1052C000E74EEBE091E229DD7DF03A775F4E317DEC
:1052D000F27C7DF1F13F209551E9D9F53A7320B088
:1052E00000000009B2948BE9C1997BEFBE2E683A4
:1052F000CBF9D77C258FBE3FF7E19933CAABE9C420
:10530000E3D3946FCE9DD7C123C453BAFBE074EEB0
:10531000BE9C62FBE4F8FBE3E0F3FD84AA91FD810F
:105320008CA7320B00000000009B2948BE9DAB117A8
:10533000DF7C1190EEFE75F3849C39DFEAD23BAA44
:10534000BE9C4E3D39443F3A775F048F114EEBEFE0
:1053500081D3BAFA718BEF93B86133FD84AA91FDC2
:10536000A53A7320B00000000009B2948BE9DFCF1C7
:1053700017DF4FD79F7CFBBFFC723E24E1CEFFF9C5
:10538000E339F9D57D389C8FE26CFFDF7C123C1F3E
:10539000F7DF7C13FBEFA718BE9E9DC30953EA7984
:1053A00015523FB4A9FCC82E0000000026CA522F97
:1053B000A77DF88BEFA7EB7F77F77FFD789D74EFE4
:1053C000FEFC65FE755F4E2723F89B3FF7DF048FD9
:1053D0007FDF7DF04FEFBE9C62FA78CAE0953EAF1
:1053E0007915522EB4A9FCC82E0000000026CA521E
```

```
:1053F0002FA77DF88BEFA9F7D7F77F9F3ED3FDABA3
:10540000F33FCFAFC65FF7DFDF528CBD1F7918C8FF
:10541000F2A58C247B4F29DF7CA3CA9639C62FA91D
:10542000F67F350FF9DD875511F7AC7F26428000F6
:105430000000013C0517C703B1E0518381B8BE13E0
:1054400082E05E04E10E10B41302880BE130703F7D
:105450014B8BC10C6404A038C1F0C809C381B8AB1
:105460000C2501EC6A0703F08581CE21C43887083A
:1054700040E81190A000000000594483AEB3B4D5B9
:105480008000000000B28DF36BAC6D35600000000AB
:105490002CA379F5C9769930000000001651BCFAEC9
:1054A0004BB4C98000000000B28973D754C7DA69039
:1054B00000000000000594483AEA66D3300000000002D6
:1054C0009B350000000014D9A800000000A6CD40C4
:1054D000000000005366A00000000029B350000000FB
:1054E00014D9A800000000A6CD400000000536651
:1054F000A0000000002CA6A58558C81843AF17339C1
:10550000D0CE14E0BD99CCAFA543141BEAA65C171E
:105510003F42C2D891D7F9CFA4CAA8000000002CFE
:10552000AF53AACA76412AE288F51BC7B23D3BA316
:10553000C5B4E44256192C129C7C8BFD8B55D3A725
:105540004E6554000000001658BFAFFBFF81D5E543
:105550002E6E7774BFA53B9CD96F4910DF48960922
:105560004EA345FEC5AAFA53E932AA000000000B7B
:105570002C5FD5D2CE917929CDFDF4EFA753E73634
:10558000B1221BE912C12A746459EC5E310C9955A1
:105590000000000005962FEAA76538BC94E6FFA539
:1055A000F4EFA9F39B58910DE7C960953A322BF6B9
:1055B0005118864CAA8000000002CB7F69F9DDCE2D
:1055C0002F251F1FF4BE9DF5F1F1AC4884BA649C
:1055D000B04AF8E78F1147B288C4326554000000022
:1055E00000165BB34955039DD0E84F883E3E8F754A
:1055F0004BABD07C630710E373E1673993C4179B0F
:105600009E863C12BC3C7889F1A24150DD86489DC3
:10561000D0E771F0BC504CA9000000000596ECD218
:105620005540C9EA53ECC463FC7D1EEA9757A31F9B
:10563000E307E57F539051283D5C5E511DB984AF6F
:10564000F1E0E1F02717D7509EA57509EA53A7410
:10565000E473D94C0000000000B2E77A4AA823EE729
:105660007FF08C7AF1EE8F754BABD18F5E3C0E875D
:105670001FD390FA50345DFBEA77412BC8E20D81CD
:105680005FF7FCDF73FF9BEE74E9D388FB650200D4
:10569000000000165CA3275528BEFBF9E231EBC7DA
:1056A000BA3DD52E1118F5E3C13837FE9C8BE48541
:1056B0004FEEBE9FF04108E20E03FEEFF9DF7FFCE4
:1056C000EFBE9D3A711F6CA040000000002CB946AAF
:1056D0002AA277DF7DF88DE8C7BA3DD52EAF46F414
:1056E00063C13837FE9C8BE0373FEEBE9FF04AF235
```

```
:1056F00038B480BFB5E77D573BEFA74E9C1F7B2892
:10570000180000000B2E5183AA8C53BA9B49BD127
:105710008F747BAA5D5E8DE8C7826F8F0FCE9C8BE6
:10572000E1BBAFBAFBEF825791C41B317E19CE9C0F
:1057300041CE9DD4E9D383EF350300000000165EDF
:1057400087CBD54074EEA86AF79F7BA3DD52EAF4BD
:105750006F3EF0487C787E74E45F095809D7DF7C9F
:1057600012BD1E48C79249CDF9D3A66FCE9DD4E98C
:10577000D383EF650300000000165E87C475E374F1
:10578000EE90613887DEFE97D4BAAF887DE518FBCE
:10579000E3F3A722F84FCAABEFBE0957E48DE275D9
:1057A0005773A775DCE9DD4E9D3B4DF651A0000017
:1057B000000165E87C475E374EE8332FC43EF7F4BE
:1057C000BE9DF53EE21F79463EF8FCE9C8BE079F44
:1057D000CAABEFBE095414FC44ED6FE74ECBF9D3CE
:1057E000BA9D3A769BECA34000000002CBECBF5E72
:1057F000374EEB5623B717F4BE9DF53EEDC4A1C35B
:10580000A53917C0F3F9557DF7C12ABFA9DCAED67B
:10581000FE74ECBF9D3BA9D3A7690FB28D000000B9
:10582000000B2FB119FCCF97BEFBF9E23B717DF461
:10583000EFA753EEDC4A1C3A53917C0EA7DD57D3F9
:10584000FE0955FD3F227EB7F3BEEBF9DF7D3A74CA
:10585000ED5B28D8000000000B2FB107FE1FE5EFB8C
:10586000EFBF11DB8EEFA77D3A7776E2575D4A7287
:105870002F81D4FBAAFA7FC12ABFBFF95FADFCEF2D
:10588000BAFE77DF4E9D3B56CA36000000002CB3AF
:10589000C8FF7AFEDEBC1BCA77DF88F3BA7654BA3B
:1058A000A53BBCEE57E67A94797C0DFF3FBFBEA7BF
:1058B0008C25AF4BBF89FDFFCFDE53F9FBCA74E9DE
:1058C000D4A33E8D9440000000000B2838819035693
:1058D0002F8F028C2E17C4A07982F65C2948FC58C1
:1058E0001C0C407A04C1C0FC1060D0584E584A02CB
:1058F000782705A02505F1D8EC7E29F44CA30000FB
:1059000000005AA0B6CB365130000000016A82D5B
:105910000B2CD944C000000005AA0B6CAF651400027
:1059200000000016A82DB2BD9450000000005AA0BAC
:105930006C5F1F65150000000016A968F6286CA2B0
:1059400000C00000029B350000000014D9A8000030
:1059500000000A6CD4000000005366A00000000029C6
:105960000B350000000014D9A800000000A6CD40082
:10597000000000005366A00000000029B350000000FC
:1059800014D9A800000000A6CD4000000005366A2A
:105990000000000029B350000000014D9A80000073
:1059A000000A6CD4000000005366A00000000029BB7
:1059B000350000000014D9A800000000A6CD40006A
:1059C00000005366A00000000029B3500000000105
:1059D0004D9A800000000A6CD4000000005366A0BD
:1059E00000000000029B350000000014D9A800000050
```

```
:1059F00000A6CD40000000005366A00000000029B373
:105A0000050000000014D9A800000000A6CD4000094
:105A1000000005366A00000000029B35000000001447
:105A2000D9A800000000A6CD40000000005366A009D
:105A300000000029B35000000014D9A800000000D2
:105A40000A6CD40000000005366A00000000029B35E1
:105A500000000000014D9A800000000A6CD400000FE
:105A60000005366A00000000029B35000000000014D17
:105A70009A800000000A6CD40000000005366A00069
:105A8000000029B35000000014D9A800000000AF
:105A9000A6CD40000000005366A000000002020006E
:105AA00000001001001001001001001001001A1
:105AB00000100100FFFFFF3C070A3BA407A11E10D6
:105AC000A0C6A0AD32071089000004D70671FB07FD
:105AD000E70400690100043C070634A403EF6100F9
:105AE00034070CEF2000360715EF3700E70F0031C1
:105AF00070C3BA406EFAE00E70300EF5202EF7C79
:105B000002EFDCA6F3F03BA80E33B0103D0708759A
:105B10001B198F8B1D901F0912007F0B100B1714D
:105B2000DF07F06901009A8900009ADF01F03DA9C2
:105B3000089120A9A12C019AF071DFA9A108079A68
:105B4000F071EFA471FCA69140A833A4189103A6AC
:105B5000B108B271FDA7B0A4A0710FA0990AA0DF8F
:105B600039102A7F0A1000072A1FFFF68B1006AD3
:105B7000B0A56832A4EE31A4189102A6A1730074F6
:105B8000A1810076A19A0078A1B3027AA1B7027C24
:105B9000F0A19A0074A1AC0076A1C50078A1DE0244
:105BA0007AA1E2027CF065010072887472D204B1BD
:105BB00077ADF0887672D6049104A6F0D20371FB1B
:105BC000A6887872D20DDF04B127ADF0A178006C01
:105BD000B10470887A72D60AB1FF6BEF6600EF45A8
:105BE0001F0887C72DF08D209B1FF6BE7090091F0
:105BF00040A4A07C72EF0700EF4900EFCD00F03F1A
:105C0000A4049104A6F031A41C99006AD706B0A59B
:105C1000689140A4196A6851F0686B75046A990824
:105C20006A71076AF0A06884096A8451FC856B99DF
:105C300006ADF09B06869B0A5689140A475066A7A
:105C400071076AF0B10286B10384887A72DE063188
:105C5000A603B1028419016FB06D80946C80366C1C
:105C600003950180376B03950180710180B1008538
:105C7000386C0D51266D82388003B126859482855B
:105C800019016D366C0391016D71FE6C90806C1979
:105C90000016C90806F990085DF0B75016E99216E04
:105CA000D70691016CB1006E19016BE084A7887A68
:105CB00072DE1231A60F19016F190280946F803ABB
:105CC000800391016FE08601F0277C51386FA018A6
:105CD0003A0EF33005470A070710770EF1B00B089
:105CE000A0AD51076FA0EF1F005470A07071077036
```

```
:105CF000EF07001904A074A0ADF0B10071A11EDD82
:105D0000A06470A0B2A0A0F0B100A1A116DD8064D3
:105D100080A0B2A0A0F001000203060705040 70D51
:105D20000C0602080903356F0AB104A05470A07074
:105D3000710770EFC4FFB0A0AD326F0AB104A05478
:105D400070A070710770EFB1FF1904A074A0ADF0DE
:105D5000E0B21FB108B2A10A10A0B0A4C4710FC470
:105D6000990AC4DF0EA11E10A0B0A5ADC6A0AD91CA
:105D700040A4F0B2A0ADB0ADA59120A4F0A1081050
:105D8000A0B2A0B0A11010A0C6A0A6A11210A0C6DB
:105D9000A0A7A11410A0C6A0A8A11610A0C6A0A9D3
:105DA000A11810A0C6A0AAA11A10A0C6A0ABA11C4?
:105DB00010A0C6A0ACF0B2BEDC650100BE9942DC0/
:105DC000D703E759009943DCD703E791009944DCF(
:105DD000D703E726019945DCD703E756019946DC4E
:105DE000D703E77601994BDCD703E7A101994DDC9E
:105DF000D703E7B801994EDCD703E7E7019950DCF8
:105E0000D703E7E6019952DCD703E7EE019954DCAA
:105E1000D703E7FC019957DCD703E71602F071F8C6
:105E200006EF7ACF9900DCDF249901DCDF1F9902AD
:105E3000DCDF1A9903DCDF159904DCDF119905DC3E
:105E4000DF109906DCDF0F9907DCDF0EF0F091061A
:105E500006F0910406F0910406F0910406F0A11BEF
:105E6000008EA11B0090B100B1B2BEDC9920DCDF36
:105E700021992CDCDF1C990DDCDF27EFD70575019C
:105E8000B19901B1DF13B100B19088DCC68EDC7529
:105E9000018E650100BEE7D0FF1904DCB0DC88E7A5
:105EA000F0FFEFED09A11B0090B1FFA3B1FFA2B27B
:105EB00090DC99FFDCDF0C910110F0B290DC997E50
:105EC000DCDF0AEF220665010090E7EEFF95FFA3F5
:105ED00095FFA271FBF79108F7EF5CCFEF41CEEF92
:105EE00056CFB100B1B0A3DCEFD709EF4ACFB0A2D3
:105EF000DCEFCE09EF41CFEF26CEF0EFA0CE990038
:105F0000DCDF109901DCDF0F9902DCDF109903DC84
:105F1000DF14F09104A6F09103A6E70C009102A60D
:105F200071FEA6E7030071FCA69140A89102A7713B
:105F3000FBA6F0EF68CE9900DCDF0B9901DCDF0DEA
:105F40009902DCDF0FF071FBF771F7F7F071F7F7EB
:105F50009104F7F071FBF79108F7F0EF40CE99004C
:105F6000DCDF069901DCDF05F071FE07F0EF3ACEC9
:105F7000A10600DC3E1406EFBBCEE70300EFB8CE6F
:105F8000910107A18801DEC2DEDC910810F0EF0D5F
:105F9000CE9900DCDF0B9903DCDF0A9904DCDF0912
:105FA000F0711F09F0916009F091A009F0EFEECDBA
:105FB000B2BEDE650100BE993FDEDF06993DDEDF41
:105FC00013F0B00ADDB2DCDEB0DE19EF52CDEF3DEA
:105FD000CEE74CCDB0DC19EFC4CDB00ADFB019DE8E
:105FE000C6DEDCF0EFB7CDB0DC0AF0EFB0CD990043
```

```
:105FF000DCDF04B0DCF6FCB101F6F0EFA0CD9900E3
:10600000DCDF069901DCDF05F071F706F091080688
:10601000F071FCF7EF87CD9900DCDF0B9901DCDF35
:10602000079902DCDF06F0F09101F7F09102F79199
:1060300001F7F0A11B008EA11B0090B100B1B2BE10
:10604000DC9920DCDF21992CDCDF1C990DDCDF27BB
:10605000EF02047501B19901B1DF13B100B190886D
:10606000DCC68EDC75018E650100BEE7D0FF190429
:10607000DCB0DC88E7F0FFEF1808F0B110F8B100F1
:10608000B1B1009FA158029AB105A99140079110A2
:1060900007B120AA71EFA871F7A89103A671BFA854
:1060A0009120A8A1580204910407320 70CB130E2F4
:1060B000EFDEB938DC2631DCF135BB0636BB03E751
:1060C0005000350703E7290030B00B75019F996434
:1060D0009FD91EE70300B1009F3F1006EF890CE730
:1060E000ED01B130E2EF50CCEF55B730DED4E7DE52
:1060F00001EF7DCC71BF0771F7A871EFA89104A6DD
:10610000B100A9EFC9063E13D63D07FAEF590CE7D7
:106110002C0031F703EF5CCCEF16049901DEDFBCF5
:106120009902DEDFB79903DEDF089904DED9C2E702
:10613000AAFFEFA6CC910810EF2D0CE74CB6910208
:1061400007A11B008EA11B0090B1008A71DFB9B1BD
:10615000039AA1E803D8918010B10AE0EF7A0BEF1F
:10616000560B3F1003E76701EF9108361303E75E14
:10617000013F8C06E09ADBE75501EF6101990019B8
:10618000D703E7EFFF990119DF06E09AC5E73F0162
:10619000B1039AB108E0EF400BB1009EB006AF71B9
:1061A0000FAFA100C0DCB0AFDCA2DC94EF5909EF67
:1061B000508361303E71701EFF606EF4A09B006A4
:1061C000E07107E0EF120BB100DCEF1A0BEFE8060D
:1061D000EF100BB100DCEF0E0BEF4F09EFD206B161
:1061E000AE0EFF40A717F10A19600D8918010EFB9
:1061F000C60A371027EF0408361303E7D100378C9F
:106200001BEFDA00990019DF13992119DF2B99226E
:1062100019DF06E70600E77AFFE70600E09AF7E7EE
:10622000AD00B006DC7106DC9906DCD6EF7502DC49
:1062300071070690DC06E757FFEFC106EFC908B00B
:106240006E07107E0EF910A30F706EF4209E70335
:1062500000EF9D09EF5A069900F6DF35E0F603E7F7
:106260002F00B1039AB118AFB13187EFF0063613A2
:106270003E745009900DCDFC6993319D708990078
:10628000F6DF36E70AFF993219D72E7501F6E7FFD8
:10629000FEEF4F0AEF1A06B1039AB116AFB131877C
:1062A000EFBB06361303E72600993319DF0B99324B
:1062B00019D7067501F6E7D7FEA100C0DCB112DCE4
:1062C000A2DC94B1009EB108E0EF0D0AEFE806EF02
:1062D0005ACAEF4ECAEFE7CA910810E7BFBCB10037
:1062E00019A11B0090B290DC65010090997EDCDF63
```

```
:1062F00000789810090D7EEF0B290DC65010090999B
:106300008190DFF399FFDCDF08997EDCDFEAE7D4D8
:10631000FFB1FFA3B1FFA2EFCE01B290DC65010097
:106320009099C8DCDF1A99C0DCDF03E7B7FFB290B1
:10633000DC65010090902DCD7ABEFD804E7C70019
:10634000EFA501B290DCB0DC19EF9C0165010090 73
:106350009901DCD703E74C00EFB401990019D70489
:10636000EF8804F0992219D704EF8604F0992119D7
:10637000D704EF8404F0993119D704EF9E04F09903
:106380005819D704EF5604F0995F19D704EF540455
:10639000F0993219D704EF6704F0993319D704EF55
:1063A0006C04F0F0B290DCEF3E0165010090B29019
:1063B000DCEF3401650100903EDC04B10019F039D6
:1063C000DC0671FE08E7300991010 87130DC71CF33
:1063D0000890DC08B290DCEF0E0165010090B0DCA3
:1063E000DE710EDE71F10890DE0830DC0AB290DC5E
:1063F000EFF50065010090EF1501990019D704EF42
:10640000E903F0EFD003F0A19000DCA2DC92B2909F
:10641000DC65010090 89810090DF37997EDCD7EE42
:1064200069040090B114DAB290DCEF2109EF14078F
:106430009900DADF037901DA69010090889290D639
:10644000E69900DADF09B120DCEFF806E0DAF7EFD1
:106450003304E790FE9939DCD904710FDCF0793709
:10646000DCF0997EDCD706B1009EE74A00993FDC5C
:10647000D706B1019EE73F00999FDCD706B1029E87
:10648000E7340099CFDCD706B1039EE7290099E7EE
:10649000DCD706B1049EE71E0099F3DCD706B105F0
:1064A0009EE7130099F9DCD706B1069EE70800992C
:1064B000FCDCD716B1079E990084D70FB0DC82753B
:1064C000 0184990384D70391808CF09882DCDFEFFC
:1064D000B10184B0DC82F0A1C0C0E0B0AFE27100D5
:1064E000E364E2E0B2E0AFF0B0DCDAB108E0B0DCE7
:1064F000E294A3E21901DCA10000DE37E204A1214D
:1065000010DE0901A284DEA2E0E0E3B0DADCF0955F
:10651000FFA395FFA2B290DC98A3DCDF04B10019C1
:10652000F065010090B290DC98A2DCDF03B10019A5
:10653000F0B1009FB100B8B100B6B100CEA100002B
:10654000C8A12800CAB101E03F1004B101DEF03358
:10655000A80971F7A871EFA8E71B0071FEA69102C8
:10656000A69140A8B160E2EFCEC79103A671BFA883
:106570009110A89108A8B1F0E2EF15B538DCCC3144
:10658000DC04B102DEF03BA82A3D070E30B01E75D8
:1065900019F99069FD907E7AEFFB105DEF099008C
:1065A000B6D904B106DEF0B1009FE79BFFB1009FB2
:1065B000E795FF9900B8D92630B01431F703EFB052
:1065C000C77501B87501B69900B8D912E779FFB15E
:1065D000 00B8B100B631F703EF99C7E76AFF690168
:1065E000 00CA390000CAD703E73C0030B019650132
```

```
1065F00000C87501B699029FD104A10000C831F707
106600000FEF6DC7E70900B100B631F703EF64C7BC
10661000B0B0E17101E194E1E0DF037501CEB0B00B
10662000E07101E0E721FF891900C8D906890D0052
10663000C8D903E7FEFE9906CED903E7F6FE991501
10664000CED103E7EDFFB103DEF034F101F03AF112
10665000FC3BF11FA198E6DC64E0DCA2DCE0B2E0E8
10666000DC9900DCD704EF1502F0EFD704650100D8
10667000E027EBEF0F02A1CCE6DC64E0DCA2DCE07B
10668000B2E0DC9900DCD704EFFA01F0EFB5046565
106690000100E027EB00000000E706E70CE712E747
1066A00018E724E72AE730E736E746E74CE755E7FF
1066B00059E75FE763E767E76BE76FE773E777E75C
1066C0007BE77FE783E796E7A9E7BCE702E708E710
1066D0000EE714E71AE726E72CE732E738E748E742
1066E0004EE757E75BE761E765E769E76DE771E765
1066F00075E779E77DE781E785E798E7ABE7BEE7F0
1067000061004345440062004449530063004352222
106710005000640044434E006500435243204552FC
10672000524F5200660046454400670043465200E0
10673000680052544E006900494E56414C4944206D
106740004652414D45006A00525450006B0043537D
1067500049203D20006C0020006D004D4346006E36
10676000002000 6F00200070002000710020 0072E7
106770000020007300200074002000750020 0076C7
106780000020007700434F4E4E45435420323430B2
106790000302F464158007800434F4E4E454354 2019
1067A000343830302F464158007900434F4E4E4523
1067B000435420373230302F464158007A00434F3F
1067C0004E4E45435420393630302F46415800A1B3
1067D0000000E0E774FEA10200E0E76DFEA1040006
1067E000E0E766FEA10600E0E75FFEA10800E0E743
1067F00058FEA10A00E0E751FEA10C00E0E74AFEC6
10680000A10E00E0E743FEA11000E0E73CFEA1126C
1068100000E0E735FEA11400E0E72EFEA11800E03D
10682000E727FEA12C00E0E720FEA12E00E0E719FB
10683000FEA13000E0E712FEA13200E0E70BFE38D7
10684000B90F39B9213AB92A997E98D7189101B967
10685000F099FF98D70771FEB99102B9F0997E9827
10686000DF0371FEB9F071FDB999C898D7F79104AB
10687000B9F0997E98D7EE71FBB991408CF0B10DCB
10688000DCEFC002F0B10DDCEFB902B10ADCEFB30E
1068900002F0650100BEB2BEDC9900DCD7F4F099CD
1068A0000ADCDF09990ADCD9049130DCF07537DCA9
1068B000F0717FA49104A6F09180A471FBA671BF32
1068C000A4F0B0DC1932F704EF7902F071F0DC18B3
1068D00004DCEFCAFFEF6C02B019DC710FDCEFBE15
1068E000FFEF60023BF706B12CDCEF57027501B1F8
```

```
:1068F0009910B1D601F0B100B1EF89FFF032BB03BE
:10690000EF05C5B006DC7106DC9904DCDF069906EC
:10691000DCDF05F0EF13FFF0EF08FFF03AF7043B80
:10692000F701F0EF5FFFA11B0090B100B1EFF9C3D9
:10693000B290DC65010090888E90D606EF83FFE769
:10694000EEFFB17EDCEF7AFFEF3AFFB11B90F0C6AD
:106950008EDC75018E99828EDE03B11B8EF0EFA75F
:1069600001B108E0EF7203B1009EA100C0DCB0AF3E
:10697000DCA2DC94EF4000361301F0EF6503EF304A
:10698000FF717F10A19600D8918010B10AE0EF4806
:1069900003EF2403371007EF62003613080FE09A84
:1069A000BDB101DCF0378CF6EF33F9B1FFDC98872D
:1069B00019D703B100DCF0717F10A13200D89180AB
:1069C00010B17EDCEF2003EFEEFE3F10FDB29488A5
:1069D000361301F065010094B29489B0891999FFCA
:1069E00088DF15089E88EFFA02B088DCEF5F03EFBE
:1069F000F502B01988E7D8FFEF0D01F0A11B008E5A
:106A0000A11B0090EF1FC371008C7100B9B10098F9
:106A1000B10083B10086B10084B100B1A11B009C1C
:106A2000EF09C33613O1F03F8C0337104B3E8C4205
:106A3000EF0DAE30DE04914013F03DA44E38B0E7C8
:106A4000388C2037101A71FB07A1640004910407E9
:106A500030B00AA100000471FB07E79FFF3A07F07E
:106A6000E715003D8C0935A4FD91208CE71C00EF53
:106A70000903378C03EFA4FEEFBDC3EFAEC2EFA551
:106A8000C2F0B1FFDCEFBC00E7EDFFB0A5DC71DFC9
:106A9000A4EFBA02B0DC193F8C16EFC5F9378C4D64
:106AA000B17EDCC68EDC65O1008EB01989E73D0041
:106AB000B0DC88099E88B089DCB01989B0DC193057
:106AC0008C34C68EDC6501008E3C8C178921008ECB
:106AD000DE1191108CB29097650100906290966558E
:106AE000100908982008EDE04A181008E348C0327
:106AF000EF8802E731FF997EDCDFF291018CE7C17C
:106B0000FFA10200D8E73500A10400D8E72E00A1BC
:106B10000800D8E72700A13200D8E72000A16400D0
:106B2000D8E71900A19600D8E71200A1C800D8E75D
:106B3000B00A14A01D8E70400A15802D8918010A7
:106B40003F10FDF03E140EEFEBC2A18001DEC6DE69
:106B5000DC71FD14F0A18501DEB2DEDE7160DE992C
:106B600060DEDF089940DEDF15E7D8FFA18A01DE8D
:106B7000DC6DEDCA18501DEB2DEDE3EDEF6F0A18AF5
:106B80001DEC6DEDCA18501DEB2DEDE3DDEF6F032
:106B9000A1FCC094B1FFDCEF4D01EF1BFDEF430101
:106BA000EF73FF361301F0EF3901361301F0B294A1
:106BB000DCEF330165010094EF2801B294DC99FF0A
:106BC000DCDF03E7E4FFEF1E0165010094EF130132
:106BD000B294DC99FFDCDF03E7CFFFEF09O1650129
:106BE0000094EFFE00B294DC99FFDCDF03E7BAFF0C
```

```
:106BF000F0A10000B4A10000B6B1008A71DFB97144
:106C0000EFB9A11B008EA11B0090B100DCEFD700F3
:106C1000EFA5FCEFCD00717F10A13505D891801054
:106C2000EF00C171EFB9370903EF1B01361301F013
:106C30003E1416B2C0DC711FDC90DC1432143271C9
:106C4000FB14A18A01DEE70E00A18501DEB2DEDEC3
:106C500030DE1EA18001DEB2DEDCEF91009910B6BD
:106C6000D90F7501B69904B6DE41717F10A10000FD
:106C7000D836A4B899008ADF2FB1FFDC888E90DF68
:106C80001EB290DCB0DC19650100906501 00B4EF24
:106C90006D00B019DC89670090DE04A11B0090EF45
:106CA000AC00EF4200E784FF71DFB9371003E77BE8
:106CB000FFB100A5EF6FC0F0B10A9FEF82AB3710B4
:106CC0000C30B0F4B130E2EF6EC0E09FEEF0717FB7
:106CD0001071FB07F036A4FDF071E0A490E0A491E0
:106CE00010A4F036A4FDF0B0DCA571BFA4F0C68EF0
:106CF000DC9120B975018E99678EDE03B11B8E5829
:106D0000908E8A99008AD603754C8A99448AD60F48
:106D100099098ADE2499008ADF01F071DFB9F091C8
:106D200010B93E0903E70300EFFBBF3F0901F0B1D3
:106D300013DCEF0FFE7501B8F03CB901F0EFE3BFD3
:106D400071EFB93F0901F0B111DCEFF7FDF0B100CF
:106D5000DEB101E01901DCD30390E0DE1901E09916
:106D60000E0D7F0B0DEDCF071EF0771BF0771DF34
:106D70000771F7A871EFA871DFA8F0B1808509014C
:106D800096D31C750186990586D70391028C9906C6
:106D900086D706B1008671FD8C908598E70C00318E
:106DA0008C03E7230071FD8CB100861801859900E2
:106DB00085D7CBC69C98EF86FAB1009865010 09CF8
:106DC000990083D70FE71E0075018371FD8CB10018
:106DD00086E7AAFF990883D717B10083B10098B25C
:106DE0009097650100 90B29096650100 90E73A0097
:106DF000990983D717B29097650100 90B290966574
:106E0000010090 90196B10183E71E00088396B244
:106E1000909609839665010090990783DF03E7093F
:106E2000 00B290E01801E0 90E0963D8C01F0888E71
:106E300090D9FAE745FF000053454E44464158209B
:106E4000323430302056 2020322E3634000000 00FC
:106E5000000000000000000000000000000000032
:106E6000000000000000000000000000000000022
:106E70000000 00000000000000000000000000012
:106E800096D31C750186990586D70391028C9906C5
:106E900086D706B1008671FD8C908598E70C00318D
:106EA0008C03E7230071FD8CB100861801859900E1
:106EB00085D7CBC69C98EF86FAB1009865010 09CF7
:106EC000990083D70FE71E0075018371FD8CB10017
:106ED00086E7AAFF990883D717B10083B10098B25B
:106EE0009097650100 90B29096650100 90E73A0096
```

```
:106EF000990983D717B29097650100908290966573
:106F000000000000000000000000000000000000081
:106F100000000000000000000000000000000000071
:106F200000000000000000000000000000000000061
:106F300000000000000000000000000000000000051
:106F400000000000000000000000000000000000041
:106F500000000000000000000000000000000000031
:106F600000000000000000000000000000000000021
:106F700000000000000000000000000000000000011
:106F800000000000000000000000000000000000001
:106F9000000000000000000000000000000000000F1
:106FA000000000000000000000000000000000000E1
:106FB000000000000000000000000000000000000D1
:106FC000000000000000000000000000000000000C1
:106FD000000000000000000000000000000000000B1
:106FE000000000000000000000000000000000000A1
:106FF00000000000000000000000000000000000091
:107000000000000000000000000000000000000080
:107010000000000000000000000000000000000070
:107020000000000000000000000000000000000060
:107030000000000000000000000000000000000050
:107040000000000000000000000000000000000040
:107050000000000000000000000000000000000030
:107060000000000000000000000000000000000020
:107070000000000000000000000000000000000010
:107080000000000000000000000000000000000000
:1070900000000000000000000000000000000000F0
:1070A00000000000000000000000000000000000E0
:1070B00000000000000000000000000000000000D0
:1070C00000000000000000000000000000000000C0
:1070D00000000000000000000000000000000000B0
:1070E00000000000000000000000000000000000A0
:1070F0000000000000000000000000000000000090
:10710000000000000000000000000000000000007F
:10711000000000000000000000000000000000006F
:10712000000000000000000000000000000000005F
:10713000000000000000000000000000000000004F
:10714000000000000000000000000000000000003F
:10715000000000000000000000000000000000002F
:10716000000000000000000000000000000000001F
:1071700000000000000000000000000000000000F
:107180000000000000000000000000000000000FF
:107190000000000000000000000000000000000EF
:1071A0000000000000000000000000000000000DF
:1071B0000000000000000000000000000000000CF
:1071C0000000000000000000000000000000000BF
:1071D0000000000000000000000000000000000AF
:1071E00000000000000000000000000000000009F
```

```
:1071F000000000000000000000000000000000008F
:107200000000000000000000000000000000000007E
:107210000000000000000000000000000000000006E
:107220000000000000000000000000000000000005E
:107230000000000000000000000000000000000004E
:107240000000000000000000000000000000000003E
:107250000000000000000000000000000000000002E
:107260000000000000000000000000000000000001E
:10727000000000000000000000000000000000000E
:107280000000000000000000000000000000000000FE
:10729000000000000000000000000000000000000EE
:1072A000000000000000000000000000000000000DE
:1072B000000000000000000000000000000000000CE
:1072C000000000000000000000000000000000000BE
:1072D000000000000000000000000000000000000AE
:1072E0000000000000000000000000000000000009E
:1072F0000000000000000000000000000000000008E
:107300000000000000000000000000000000000007D
:107310000000000000000000000000000000000006D
:107320000000000000000000000000000000000005D
:107330000000000000000000000000000000000004D
:107340000000000000000000000000000000000003D
:107350000000000000000000000000000000000002D
:107360000000000000000000000000000000000001D
:10737000000000000000000000000000000000000D
:1073800000000000000000000000000000000000FD
:1073900000000000000000000000000000000000ED
:1073A00000000000000000000000000000000000DD
:1073B00000000000000000000000000000000000CD
:1073C00000000000000000000000000000000000BD
:1073D00000000000000000000000000000000000AD
:1073E0000000000000000000000000000000000009D
:1073F0000000000000000000000000000000000008D
:107400000000000000000000000000000000000007C
:107410000000000000000000000000000000000006C
:107420000000000000000000000000000000000005C
:107430000000000000000000000000000000000004C
:107440000000000000000000000000000000000003C
:107450000000000000000000000000000000000002C
:107460000000000000000000000000000000000001C
:10747000000000000000000000000000000000000C
:1074800000000000000000000000000000000000FC
:1074900000000000000000000000000000000000EC
:1074A00000000000000000000000000000000000DC
:1074B00000000000000000000000000000000000CC
:1074C00000000000000000000000000000000000BC
:1074D00000000000000000000000000000000000AC
:1074E0000000000000000000000000000000000009C
```

```
:1074F00000000000000000000000000000000008C
:107500000000000000000000000000000000007B
:107510000000000000000000000000000000006B
:107520000000000000000000000000000000005B
:107530000000000000000000000000000000004B
:107540000000000000000000000000000000003B
:107550000000000000000000000000000000002B
:107560000000000000000000000000000000001B
:107570000000000000000000000000000000000B
:10758000000000000000000000000000000000FB
:10759000000000000000000000000000000000EB
:1075A000000000000000000000000000000000DB
:1075B000000000000000000000000000000000CB
:1075C000000000000000000000000000000000BB
:1075D000000000000000000000000000000000AB
:1075E00000000000000000000000000000000009B
:1075F00000000000000000000000000000000008B
:107600000000000000000000000000000000007A
:107610000000000000000000000000000000006A
:107620000000000000000000000000000000005A
:107630000000000000000000000000000000004A
:107640000000000000000000000000000000003A
:107650000000000000000000000000000000002A
:107660000000000000000000000000000000001A
:107670000000000000000000000000000000000A
:10768000000000000000000000000000000000FA
:10769000000000000000000000000000000000EA
:1076A000000000000000000000000000000000DA
:1076B000000000000000000000000000000000CA
:1076C000000000000000000000000000000000BA
:1076D000000000000000000000000000000000AA
:1076E00000000000000000000000000000000009A
:1076F00000000000000000000000000000000008A
:1077000000000000000000000000000000000079
:1077100000000000000000000000000000000069
:1077200000000000000000000000000000000059
:1077300000000000000000000000000000000049
:1077400000000000000000000000000000000039
:1077500000000000000000000000000000000029
:1077600000000000000000000000000000000019
:1077700000000000000000000000000000000009
:10778000000000000000000000000000000000F9
:10779000000000000000000000000000000000E9
:1077A000000000000000000000000000000000D9
:1077B000000000000000000000000000000000C9
:1077C000000000000000000000000000000000B9
:1077D000000000000000000000000000000000A9
:1077E0000000000000000000000000000000000099
```

```
:1077F000000000000000000000000000000000089
:10780000000000000000000000000000000000078
:10781000000000000000000000000000000000068
:10782000000000000000000000000000000000058
:10783000000000000000000000000000000000048
:10784000000000000000000000000000000000038
:10785000000000000000000000000000000000028
:10786000000000000000000000000000000000018
:10787000000000000000000000000000000000008
:107880000000000000000000000000000000000F8
:107890000000000000000000000000000000000E8
:1078A0000000000000000000000000000000000D8
:1078B0000000000000000000000000000000000C8
:1078C0000000000000000000000000000000000B8
:1078D0000000000000000000000000000000000A8
:1078E000000000000000000000000000000000098
:1078F000000000000000000000000000000000088
:10790000000000000000000000000000000000077
:10791000000000000000000000000000000000067
:10792000000000000000000000000000000000057
:10793000000000000000000000000000000000047
:10794000000000000000000000000000000000037
:10795000000000000000000000000000000000027
:10796000000000000000000000000000000000017
:10797000000000000000000000000000000000007
:107980000000000000000000000000000000000F7
:107990000000000000000000000000000000000E7
:1079A0000000000000000000000000000000000D7
:1079B0000000000000000000000000000000000C7
:1079C0000000000000000000000000000000000B7
:1079D0000000000000000000000000000000000A7
:1079E000000000000000000000000000000000097
:1079F000000000000000000000000000000000087
:107A0000000000000000000000000000000000076
:107A1000000000000000000000000000000000066
:107A2000000000000000000000000000000000056
:107A3000000000000000000000000000000000046
:107A4000000000000000000000000000000000036
:107A5000000000000000000000000000000000026
:107A6000000000000000000000000000000000016
:107A7000000000000000000000000000000000006
:107A80000000000000000000000000000000000F6
:107A90000000000000000000000000000000000E6
:107AA0000000000000000000000000000000000D6
:107AB0000000000000000000000000000000000C6
:107AC0000000000000000000000000000000000B6
:107AD0000000000000000000000000000000000A6
:107AE000000000000000000000000000000000096
```

```
:107AF0000000000000000000000000000000000086
:107B00000000000000000000000000000000000075
:107B10000000000000000000000000000000000065
:107B20000000000000000000000000000000000055
:107B30000000000000000000000000000000000045
:107B40000000000000000000000000000000000035
:107B50000000000000000000000000000000000025
:107B60000000000000000000000000000000000015
:107B70000000000000000000000000000000000005
:107B800000000000000000000000000000000000F5
:107B900000000000000000000000000000000000E5
:107BA00000000000000000000000000000000000D5
:107BB00000000000000000000000000000000000C5
:107BC00000000000000000000000000000000000B5
:107BD00000000000000000000000000000000000A5
:107BE0000000000000000000000000000000000095
:107BF0000000000000000000000000000000000085
:107C00000000000000000000000000000000000074
:107C10000000000000000000000000000000000064
:107C20000000000000000000000000000000000054
:107C30000000000000000000000000000000000044
:107C40000000000000000000000000000000000034
:107C50000000000000000000000000000000000024
:107C60000000000000000000000000000000000014
:107C70000000000000000000000000000000000004
:107C800000000000000000000000000000000000F4
:107C900000000000000000000000000000000000E4
:107CA00000000000000000000000000000000000D4
:107CB00000000000000000000000000000000000C4
:107CC00000000000000000000000000000000000B4
:107CD00000000000000000000000000000000000A4
:107CE0000000000000000000000000000000000094
:107CF0000000000000000000000000000000000084
:107D00000000000000000000000000000000000073
:107D10000000000000000000000000000000000063
:107D20000000000000000000000000000000000053
:107D30000000000000000000000000000000000043
:107D40000000000000000000000000000000000033
:107D50000000000000000000000000000000000023
:107D60000000000000000000000000000000000013
:107D70000000000000000000000000000000000003
:107D800000000000000000000000000000000000F3
:107D900000000000000000000000000000000000E3
:107DA00000000000000000000000000000000000D3
:107DB00000000000000000000000000000000000C3
:107DC00000000000000000000000000000000000B3
:107DD00000000000000000000000000000000000A3
:107DE0000000000000000000000000000000000093
```

```
:107DF0000000000000000000000000000000000083
:107E00000000000000000000000000000000000072
:107E10000000000000000000000000000000000062
:107E20000000000000000000000000000000000052
:107E30000000000000000000000000000000000042
:107E40000000000000000000000000000000000032
:107E50000000000000000000000000000000000022
:107E60000000000000000000000000000000000012
:107E70000000000000000000000000000000000002
:107E800000000000000000000000000000000000F2
:107E900000000000000000000000000000000000E2
:107EA00000000000000000000000000000000000D2
:107EB00000000000000000000000000000000000C2
:107EC00000000000000000000000000000000000B2
:107ED00000000000000000000000000000000000A2
:107EE0000000000000000000000000000000000092
:107EF0000000000000000000000000000000000082
:107F00000000000000000000000000000000000071
:107F10000000000000000000000000000000000061
:107F20000000000000000000000000000000000051
:107F30000000000000000000000000000000000041
:107F40000000000000000000000000000000000031
:107F50000000000000000000000000000000000021
:107F60000000000000000000000000000000000011
:107F70000000000000000000000000000000000001
:107F800000000000000000000000000000000000F1
:107F900000000000000000000000000000000000E1
:107FA00000000000000000000000000000000000D1
:107FB00000000000000000000000000000000000C1
:107FC00000000000000000000000000000000000B1
:107FD00000000000000000000000000000000000A1
:107FE0000000000000000000000000000000000091
:107FF0000000000000000000000000000000000081
:00000001FF
```

1. A method for transmitting a report in text data from a monitoring apparatus to a facsimile machine, the apparatus being connected directly to process equipment by electrical leads for monitoring at least one separately-controlled process variable, the method including the steps of:

providing a conversion module within the apparatus and having firmware embedded in at least one semiconductor chip therein for converting a first code to a second code;

transmitting a command set to the conversion module for selecting a facsimile mode of operation;

implementing transmission of text data to the conversion module in a first code, the text data relating to at least one process variable;

initiating a converting step upon the occurrence of at least one of a predetermined plurality of events including (a) receipt at the conversion module of a signal indicating the end of the text data and (b) the absence of text data transmission over a time in excess of a predetermined time;

converting such text data to a second code using only firmware, thereby providing converted binary text data; and, transmitting such converted binary text data from the apparatus directly to the facsimile machine, such converted binary text data being in the form of a report transmitted over a telephone line.

2. The method of claim 1 wherein such command set includes a special character for selecting the facsimile mode of operation.

3. The method of claim 2 wherein such command set further includes the encoded dial number of the facsimile machine.

4. The method of claim 3 wherein such command set further includes a command for specifying a page text header.

5. The method of claim 4 wherein such command set further includes a command for initiating a page break.

6. The method of claim 4 wherein the monitoring apparatus includes a host processor and the command set further includes a command for establishing the baud rate of communication between the host processor and the conversion module.

7. The method of claim 1 wherein the second code is coincident with that used by the facsimile machine.

8. The method of claim 7 wherein the first code is ASCII code.

9. The method of claim 1 wherein the design of the firmware is such that the converting step is performed using coding rules in accordance with a predetermined specification.

10. The method of claim 9 wherein the coding rules are one-dimensional coding rules and the specification is U a CCITT specification.

11. The method of claim 1 wherein the implementing step includes the steps of:
- transmitting a prompting signal to initiate transmission of text data in a first code to the conversion module; and,
- initiating the converting step upon the occurrence of one of a predetermined plurality of events.

12. The method of claim 11 wherein the plurality of events includes the following events:
- receipt at the conversion module of a signal indicating the end of the text data;
- the absence of text data transmission over a time in excess of a predetermined time.

13. An apparatus for monitoring at least one separately-controlled equipment process variable and reporting the status of the variable directly to a facsimile machine over a telephone line, the apparatus being connected directly to such equipment by electrical leads, the apparatus being free of magnetic discs and program input boards used to convert text data in a first code to binary text data in a second code, the apparatus including:
- a conversion module within the apparatus and having firmware embedded in at least one semiconductor chip therein for converting text data in a first code to binary text data in a second code upon the occurrence of at least one of a predetermined plurality of events including (a) receipt at the conversion module of a signal indicating the end of the text data and (b) the absence of text data transmission over a time in excess of a predetermined time;
- a memory module connected to the conversion module for facilitating communication of text data in a first code between the conversion module and such memory module;
- an analog module connected to the conversion module for interfacing a modem with the telephone line;

the apparatus thereby being arranged to generate text data in a first code, convert such text data to binary data in a second code using only the firmware and transmit such converted binary data in the form of a report directly to the facsimile machine over the telephone line.

14. The apparatus of claim 13 wherein such apparatus includes a monitoring portion and a modem portion integrated to form a stand alone apparatus.

15. The apparatus of claim 13 wherein such apparatus is comprised of a monitoring portion and a modem portion which are separated from one another and compatibly connectable to one another.

16. The apparatus of claim 13 wherein such apparatus is connected to a water treatment system and a monitor parameter is an indicia of water quality.

17. The apparatus of claim 13 wherein such apparatus is connected to a gas pipeline and a monitored parameter is a component of gas quality measurement.

* * * * *

UNITED STATES PATENT AND TRADEMARK OFFICE
CERTIFICATE OF CORRECTION

PATENT NO. : 5,335,267
DATED : August 2, 1994
INVENTOR(S) : John N. Evers and Thomas N. Hilleary It is certified that error appears in the above-indentified patent and that said Letters Patent is hereby corrected as shown below:

On the front page under "Attorney, Agent or Firm", delete "Shupte" and insert --Shupe--.

In column 2, line 54, delete "u".

In column 5, line 60, delete "--" and insert -- - --.

In column 7, line 34, delete "--" and insert -- - --.

In column 7, line 61, delete "+Hi" and insert --"+H1"--.

The phrase "What is claimed is:" at column 10, line 25, should be placed at column 93, following the program listing and immediately prior to Claim 1.

In column 95, line 8, delete "U".

Signed and Sealed this

Twenty-third Day of January, 1996

Attest:

BRUCE LEHMAN

Attesting Officer

Commissioner of Patents and Trademarks